(12) United States Patent
Siomina et al.

(10) Patent No.: US 11,382,065 B2
(45) Date of Patent: Jul. 5, 2022

(54) CONTROLLING USER EQUIPMENT CARRIER AGGREGATION CONFIGURATION WITH ENHANCED MULTIMEDIA BROADCAST MULTICAST SERVICES

(71) Applicant: TELEFONAKTIEBOLAGET LM ERICSSON (PUBL), Stockholm (SE)

(72) Inventors: Iana Siomina, Täby (SE); Muhammad Kazmi, Sundbyberg (SE); Ali Behravan, Stockholm (SE)

(73) Assignee: TELFFONAKTIEBOLAGET LM ERICSSON (PUBL), Stockholm (SE)

( * ) Notice: Subject to any disclaimer, the term of this patent is extended or adjusted under 35 U.S.C. 154(b) by 192 days.

(21) Appl. No.: 16/485,688

(22) PCT Filed: Dec. 28, 2017

(86) PCT No.: PCT/IB2017/058475
§ 371 (c)(1),
(2) Date: Aug. 13, 2019

(87) PCT Pub. No.: WO2018/146538
PCT Pub. Date: Aug. 16, 2018

(65) Prior Publication Data
US 2020/0059894 A1 Feb. 20, 2020

Related U.S. Application Data

(60) Provisional application No. 62/458,118, filed on Feb. 13, 2017.

(51) Int. Cl.
*H04W 72/00* (2009.01)
*H04L 5/00* (2006.01)
(Continued)

(52) U.S. Cl.
CPC ......... *H04W 72/005* (2013.01); *H04L 5/0098* (2013.01); *H04W 4/06* (2013.01); *H04W 72/0453* (2013.01)

(58) Field of Classification Search
None
See application file for complete search history.

(56) References Cited

U.S. PATENT DOCUMENTS 9,107,186 B2 8/2015 Zhang et al.
10,986,576 B2 * 4/2021 Lee ...................... H04W 16/14
(Continued)

FOREIGN PATENT DOCUMENTS

| EP | 2276275 A1 | 1/2011 |
| RU | 2530012 C2 | 10/2014 |
| WO | 2012116219 A1 | 8/2012 |

OTHER PUBLICATIONS

Ericsson et al., "Clarigication on frequency information in MBMSInterestindication message", 3GPP TSG-RAN WG2 #75bis, R2-115300, Oct. 10-14, 2011.
(Continued)

*Primary Examiner* — Mariela Vidal Carpio

(57) ABSTRACT

Provided is a method operating a wireless device in a wireless communication network. The method includes determining a carrier aggregation (CA) configuration for the wireless device to receive eMBMS data on multiple carriers of a dedicated mode type and/or a mixed mode type. The CA configuration is determined based at least partially on at least one of a pre-defined rule that delimits one or more acceptable characteristics for at least a portion of the multiple carriers, a capability of the wireless device that relates to receiving and decoding eMBMS data on multiple carriers, and a pre-defined set of acceptable CA configurations. The method includes configuring the determined CA configura-
(Continued)

tion in the wireless device and performing one or more operational tasks under the configured CA configuration.

20 Claims, 18 Drawing Sheets

(51) Int. Cl.
*H04W 4/06* (2009.01)
*H04W 72/04* (2009.01)

(56) References Cited

U.S. PATENT DOCUMENTS

| | | | | |
|---|---|---|---|---|
| 2010/0118706 | A1* | 5/2010 | Parkvall | H04L 5/0023 |
| | | | | 370/241 |
| 2012/0213141 | A1* | 8/2012 | Damnjanovic | H04W 72/005 |
| | | | | 370/312 |
| 2014/0119265 | A1 | 5/2014 | Shauh et al. | |
| 2015/0131516 | A1* | 5/2015 | Zhang | H04L 5/0007 |
| | | | | 370/312 |
| 2016/0014571 | A1* | 1/2016 | Lee | H04W 4/06 |
| | | | | 370/312 |
| 2016/0323061 | A1* | 11/2016 | Lee | H03M 13/6547 |
| 2017/0026935 | A1* | 1/2017 | Zhang | H04L 5/0094 |
| 2017/0290014 | A1* | 10/2017 | Kim | H04W 48/12 |
| 2018/0206137 | A1* | 7/2018 | Ryu | H04W 4/06 |
| 2018/0234826 | A1* | 8/2018 | Maattanen | H04W 68/02 |
| 2019/0281523 | A1* | 9/2019 | Lee | H04W 36/30 |
| 2020/0059894 | A1* | 2/2020 | Siomina | H04W 4/06 |
| 2020/0228931 | A1* | 7/2020 | Maattanen | H04W 76/50 |
| 2020/0267650 | A1* | 8/2020 | Lee | H04W 52/0229 |

OTHER PUBLICATIONS

Ericsson et al. "WF on requirements impact with eMBMS enhancements", 3GPP TSG-RAN WG4 Meeting #82, R4-1702171, Agenda item 7.17.4, Feb. 13-17, 2017, Athens Greece.

Ericsson, "Reference sensitivity requirements for eMBMS enhancements", 3GPP TSG RAN WG4 #82, R4-1701708, Feb. 3, 2017.

Ericsson, "UE Capabilities for feMBMS", 3GPP TSG-RAN WG2 Meeting #97, R2-1701599, Feb. 13-17, 2017, Athens, Greece.

* cited by examiner

CONTROLLING USER EQUIPMENT CARRIER AGGREGATION CONFIGURATION WITH ENHANCED MULTIMEDIA BROADCAST MULTICAST SERVICES

RELATED APPLICATIONS

This application is a national stage application of International Patent Application No. PCT/IB2017/058475, filed Dec. 28, 2017, which claims the benefit of U.S. provisional patent application Ser. No. 62/458,118, filed Feb. 13, 2017, the disclosures of which are hereby incorporated herein by reference in their entirety.

TECHNICAL FIELD

The disclosed subject matter relates generally to telecommunications. Certain embodiments relate more particularly to efficient use of enhanced multimedia broadcast multicast services (EMBMS) with carrier aggregation techniques in a network.

BACKGROUND

In wireless communications networks, there are occasions where the data originating from one node is intended for multiple users. These services are called broadcasting or multicasting and the most well-known examples are TV and radio broadcasting. Cellular standard Evolved Universal Terrestrial Radio Access (E-UTRA), which is the air interface of Long Term Evolution (LTE), supports multicasting. This multicasting service is called Multimedia Broadcast Multicast Services (MBMS).

In MBMS the data is transmitted to all users that are in the same MBMS service area, which may include comprises several cells. Each of the network nodes in the MBMS area may transmit the data in its own cell area. If the transmissions are time synchronized, the received signal at the user terminal appears as the transmission of a single point over a time dispersive channel. In LTE this type of transmission is called MBMS Single Frequency Network (MBSFN). The advantages of MBSFN may include increased received signal strength, reduced interference at the borders of the cells within the same MBSFN area, and additional diversity due to receiving from multiple nodes.

Brief reference is now made to FIG. 5, which is a block diagram illustrating MBSFN channel mapping across logical, transport and physical channels. As illustrated, the transport channel for multicast is called multicast channel (MCH), which consists of two logical channels: Multicast Traffic Channel (MTCH), and Multicast Control Channel (MCCH). As the names suggest, MTCH carries MBMS data while MCCH carries control information. The MCH is mapped to the physical channel, referred to as the Physical Multicast Channel (PMCH), which is then transmitted in MBSFN subframes.

With legacy MBMS, the network was generally unaware of whether the UE is receiving MBMS or not. With enhanced MBMS, the network needs to be aware of whether mixed cells with unicast/FeMBSFN subframes need to be configured for a UE and may even need to be aware of whether (e)MBMS is used by the UE on a dedicated carrier. Furthermore, this may impact general CA configuration of the UE.

Approaches described in the Background section could be pursued, but are not necessarily approaches that have been previously conceived or pursued. Therefore, unless otherwise indicated herein, the approaches described in the Background section are not prior art to the inventive embodiments disclosed in this application and are not admitted to be prior art by inclusion in the Background section. Therefore, any description contained in the Background section may be moved to the Detailed Description section.

SUMMARY

Example methods, nodes, and systems are operable to perform methods of operating a wireless device in a wireless communication network. Such methods may include determining a carrier aggregation (CA) configuration for the wireless device to receive multicast data on a plurality of carriers of a dedicated mode type and/or a mixed mode type. In some embodiments, the CA configuration may be determined based at least partially on at least one of a pre-defined rule that delimits one or more acceptable characteristics for at least a portion of the plurality of carriers, a capability of the wireless device that relates to receiving and decoding multicast data on a plurality of carriers, and a pre-defined set of acceptable CA configurations. Operations may include configuring the determined CA configuration in the wireless device and performing one or more operational tasks under the configured CA configuration.

In some embodiments, determining the CA configuration includes sending to another node in the wireless communication network, a wireless device capability that corresponds to the wireless device's capability to support one or CA configurations. Some embodiments provide that the wireless device's capability to support one or more CA configurations includes at least one of a quantity of carriers during a dedicated multicast operation mode and a quantity of mixed cells that include unicast and FeMBSFN subframes.

In some embodiments, determining the CA configuration further comprises determining, at the wireless device, an interest in receiving multicast data on a number of dedicated carriers and/or a quantity of mixed mode carriers and transmitting to the another node in the wireless communication network the interest that is determined. In some embodiments, determining the CA configuration further comprises determining an acceptable CA configuration that includes at least one carrier of the dedicated mode or the mixed mode type and configuring the acceptable CA configuration.

In some embodiments, determining the acceptable CA configuration comprises selecting from a pre-defined set of acceptable CA configurations. Some embodiments provide that determining the acceptable CA configuration is based on an acceptable configuration or characteristics of the acceptable configuration received from the another network node. In some embodiments, configuring the acceptable CA configuration comprises aggregating, by the wireless device, the carriers with multicast data to receive multicast data. Some embodiments provide that configuring the acceptable CA configuration comprises at least one of modifying a set of CC by deactivating one or more SCells, replacing a first mode type cell in a set of serving cells with a second mode type cell. The first mode type cell is one of the dedicated mode type and mixed mode type, and the second mode type cell is the other one of the dedicated mode type and the mixed mode type. Operations may further include creating or extending a set of one or more UE-operated carriers with multicast data.

In some embodiments, sending to the another node comprises at least one of providing an indicator of whether or not an adaptation is done for CA configuration and/or for multicast carriers and/or providing information about carriers that have been deconfigured and/or deactivated.

Some embodiments provide that determining the acceptable CA configuration is based on at least one of a number of CC's with mixed cells, a number of CCs having a predefined percentage range of subframes per carrier, a number of CCs without mixed cells, and a number of activated or deactivated mixed SCells.

In some embodiments, performing the one or more operational tasks comprises at least one of receiving multicast data in FeMBSFN subframes, receiving unicast data in one or more serving cells, performing a measurement in unicast subframes meeting a pre-defined performance requirement, performing and/or logging a measurement in FeMBSFN subframes meeting a pre-defined performance requirement, and transmitting to the another node results of determining the acceptable configuration and/or an adaptation of the set of carriers.

In some embodiments, the capability of the wireless device that relates to receiving and decoding multicast data on the plurality of carriers comprises a defined quantity of carriers during dedicated multicast mode and/or with mixed multicast mode of operation. Some embodiments provide that the capability of the wireless device that relates to receiving and decoding multicast data on the plurality of carriers comprises at least one of a number of carriers and/or bands with mixed cells that are supported, a number of a total of carriers and/or bands in the CA that are supported, a number of carriers and/or bands in the CA that are not multicast that are supported, a number of carriers and/or bands with mixed cells using a different numerology in MBSFN subframes than in unicast subframes in the CA that are supported, a number of carriers and/or bands for which multicast data can be aggregated, and a number of MBSFN areas in total or MBSFN areas with specific properties or specific MBSFN configurations in the CA that are supported.

In some embodiments, FeMBMS subframes comprise a subframe transmitting multicast data using a first numerology that includes a subcarrier spacing of 1.25 KHz. Some embodiments provide that the first numerology further comprises a symbol duration of about 800 μsec and a CP length of about 200μ. In some embodiments, multicast operation and/or data is any one of: a MBMS operation or data and an eMBMS operation or data.

Some embodiments are directed to methods of operating a network node in a wireless communication network. Such methods may include determining a carrier aggregation (CA) configuration for a wireless device to receive multicast data on a plurality of carriers of a dedicated mode type and/or a mixed mode type, the CA configuration being determined based at least partially on at least one of a pre-defined rule that delimits one or more acceptable characteristics for at least a portion of the plurality of carriers, a capability of the wireless device that relates to receiving and decoding multicast data on a plurality of carriers, and a pre-defined set of acceptable CA configurations. Operations may include configuring the determined CA configuration for the wireless device and obtaining a result of performing one or more operational tasks under the configured CA configuration.

In some embodiments, determining the CA configuration comprises receiving by the network node in the wireless communication network, a wireless device capability that corresponds to the wireless device's capability to support one or CA configurations. Some embodiments provide that the wireless device's capability to support one or more CA configurations comprises at least one of a quantity of carriers during a dedicated multicast operation mode and a quantity of mixed cells that include unicast and FeMBSFN subframes.

In some embodiments, determining the CA configuration further comprises receiving, by the network node in the wireless communication network, an indication that the wireless device has an interest in receiving multicast data on a quantity of dedicated carriers and/or a quantity of mixed mode carriers. Some embodiments provide that determining the CA configuration further comprises determining an acceptable CA configuration that includes at least one carrier of the dedicated mode or the mixed mode type, and configuring the acceptable CA configuration.

In some embodiments, determining the acceptable CA configuration comprises selecting from a pre-defined set of acceptable CA configurations. Some embodiments provide that determining the acceptable CA configuration is based on an acceptable configuration or characteristics of the acceptable configuration at the network node. In some embodiments, configuring the acceptable CA configuration comprises aggregating the carriers with multicast data to receive multicast data. Some embodiments provide that configuring the acceptable CA configuration comprises at least one of modifying a set of CC by deactivating one or more SCells and replacing a first mode type cell in a set of serving cells with a second mode type cell. In some embodiments, the first mode type cell is one of the dedicated mode type and mixed mode type and the second mode type cell is the other one of the dedicated mode type and the mixed mode type. Some embodiments provide creating or extending a set of one or more UE-operated carriers with multicast data.

In some embodiments, receiving, by the network node in the wireless communication network, the indication that the wireless device has an interest in receiving multicast data comprises at least one of receiving an indicator of whether or not an adaptation is done for CA configuration and/or for multicast carriers and/or receiving information about carriers that have been deconfigured and/or deactivated.

In some embodiments, determining the acceptable CA configuration is based on at least one of a number of CC's with mixed cells, a number of CCs having a predefined percentage range of subframes per carrier, a number of CCs without mixed cells, and a number of activated or deactivated mixed SCells.

Some embodiments provide that performing the one or more operational tasks comprises at least one of receiving multicast data in FeMBSFN subframes, receiving unicast data in one or more serving cells, performing a measurement in unicast subframes meeting a pre-defined performance requirement, performing and/or logging a measurement in FeMBSFN subframes meeting a pre-defined performance requirement, and receiving results of determining the acceptable configuration and/or an adaptation of the set of carriers.

In some embodiments, the capability of the wireless device that relates to receiving and decoding multicast data on the plurality of carriers comprises a defined quantity of carriers during dedicated MBMS mode and/or with mixed MBMS mode of operation.

In some embodiments, the capability of the wireless device that relates to receiving and decoding multicast data on the plurality of carriers comprises at least one of a number of carriers and/or bands with mixed cells that are supported, a number of a total of carriers and/or bands in the CA that are supported, a number of carriers and/or bands in the CA that are not multicast data that are supported, a number of carriers and/or bands with mixed cells using a different numerology in MBSFN subframes than in unicast subframes in the CA that are supported, a number of carriers and/or bands for which multicast data can be aggregated, and a number of MBSFN areas in total or MBSFN areas with specific properties or specific MBSFN configurations in the CA that are supported.

Some embodiments provide that FeMBMS subframes comprise a subframe transmitting multicast data using a first numerology that includes a subcarrier spacing of 1.25 KHz. In some embodiments, the first numerology further comprises a symbol duration of about 800 μsec and a CP length of about 200μ. Some embodiments provide that multicast operation and/or data is any one of: a MBMS operation or data and an eMBMS operation or data.

Some embodiments include a computer program product comprising a non-transitory computer readable medium storing program code that when executed by a processor of a wireless device causes the wireless device to perform operations disclosed herein.

Some embodiments include a UE that is adapted to perform operations corresponding to methods disclosed herein.

Some embodiments are directed to a radio communication network that includes a first radio node that comprises a transceiver (301, 321) to provide wireless communication over a radio interface, at least one processor (305, 325) coupled to the transceiver and at least one memory coupled to the at least one processor and storing program code that when executed by the at least one processor causes the at least one processor to perform operations described herein. Operations include determining a carrier aggregation (CA) configuration for the wireless device to receive multicast data on a plurality of carriers of a dedicated mode type and/or a mixed mode type. The CA configuration may be determined based at least partially on at least one of a pre-defined rule that delimits one or more acceptable characteristics for at least a portion of the plurality of carriers, a capability of the wireless device that relates to receiving and decoding multicast data on a plurality of carriers, and a pre-defined set of acceptable CA configurations. Operations may include configuring the determined CA configuration in the wireless device and performing one or more operational tasks under the configured CA configuration.

Some embodiments are directed to a wireless communication device comprising a transceiver to provide wireless communication over a radio interface, at least one processor coupled to the transceiver and at least one memory coupled to the at least one processor and storing program code that when executed by the at least one processor causes the at least one processor to perform operations disclosed herein. Operations may include determining a carrier aggregation (CA) configuration for the wireless device to receive multicast data on a plurality of carriers of a dedicated mode type and/or a mixed mode type. The CA configuration may be determined based at least partially on at least one of a pre-defined rule that delimits one or more acceptable characteristics for at least a portion of the plurality of carriers, a capability of the wireless device that relates to receiving and decoding multicast data on a plurality of carriers, and a pre-defined set of acceptable CA configurations. Operations may include configuring the determined CA configuration in the wireless device and performing one or more operational tasks under the configured CA configuration.

In some embodiments, determining the CA configuration comprises sending to another node in the wireless communication network, a wireless device capability that corresponds to the wireless device's capability to support one or CA configurations. In some embodiments, the wireless device's capability to support one or more CA configurations comprises at least one of a quantity of carriers during a dedicated multicast operation mode and a quantity of mixed cells that include unicast and FeMBSFN subframes. Operations may include determining, at the wireless device, an interest in receiving multicast on a quantity of dedicated carriers and/or a quantity of mixed mode carriers, transmitting to the another node in the wireless communication network the interest that is determined, determining an acceptable CA configuration that includes at least one carrier of the dedicated mode or the mixed mode type, and configuring the acceptable CA configuration. Some embodiments provide that configuring the acceptable CA configuration comprises aggregating the carriers with multicast to receive multicast data.

In some embodiments, configuring the acceptable CA configuration comprises at least one of modifying a set of CC by deactivating one or more SCells, replacing a first mode type cell in a set of serving cells with a second mode type cell. Some embodiments provide that the first mode type cell is one of the dedicated mode type and mixed mode type and the second mode type cell is the other one of the dedicated mode type and the mixed mode type. Embodiments may include creating or extending a set of one or more UE-operated carriers with multicast data.

Some embodiments are directed to a network node comprising a carrier aggregation (CA) configuration determining module that is configured to determine a carrier aggregation (CA) configuration for the wireless device to receive multicast data on a plurality of carriers of a dedicated mode type and/or a mixed mode type, In some embodiments, the CA configuration may be determined based at least partially on at least one of a pre-defined rule that delimits one or more acceptable characteristics for at least a portion of the plurality of carriers, a capability of the wireless device that relates to receiving and decoding multicast data on a plurality of carriers, and a pre-defined set of acceptable CA configurations. Operations may include a determined CA configuration configuring module that is configured to configure the determined CA configuration in the wireless device and a performing module that is configured to perform one or more operational tasks under the configured CA configuration.

Some embodiments are directed to a network node comprising a carrier aggregation (CA) configuration determining module that is configured to determine a CA configuration for a wireless device to receive multicast data on a plurality of carriers of a dedicated mode type and/or a mixed mode type. In some embodiments, the CA configuration may be determined based at least partially on at least one of a pre-defined rule that delimits one or more acceptable characteristics for at least a portion of the plurality of carriers, a capability of the wireless device that relates to receiving and decoding multicast data on a plurality of carriers, and a pre-defined set of acceptable CA configurations. Embodiments may include a determined CA configuration configuring module that is configured to configure the determined CA configuration for the wireless device and an obtaining module that is configured to obtain a result of performing one or more operational tasks under the configured CA configuration.

BRIEF DESCRIPTION OF THE DRAWINGS

The drawings illustrate selected embodiments of the disclosed subject matter. In the drawings, like reference labels denote like features.

DETAILED DESCRIPTION

Figure 1:
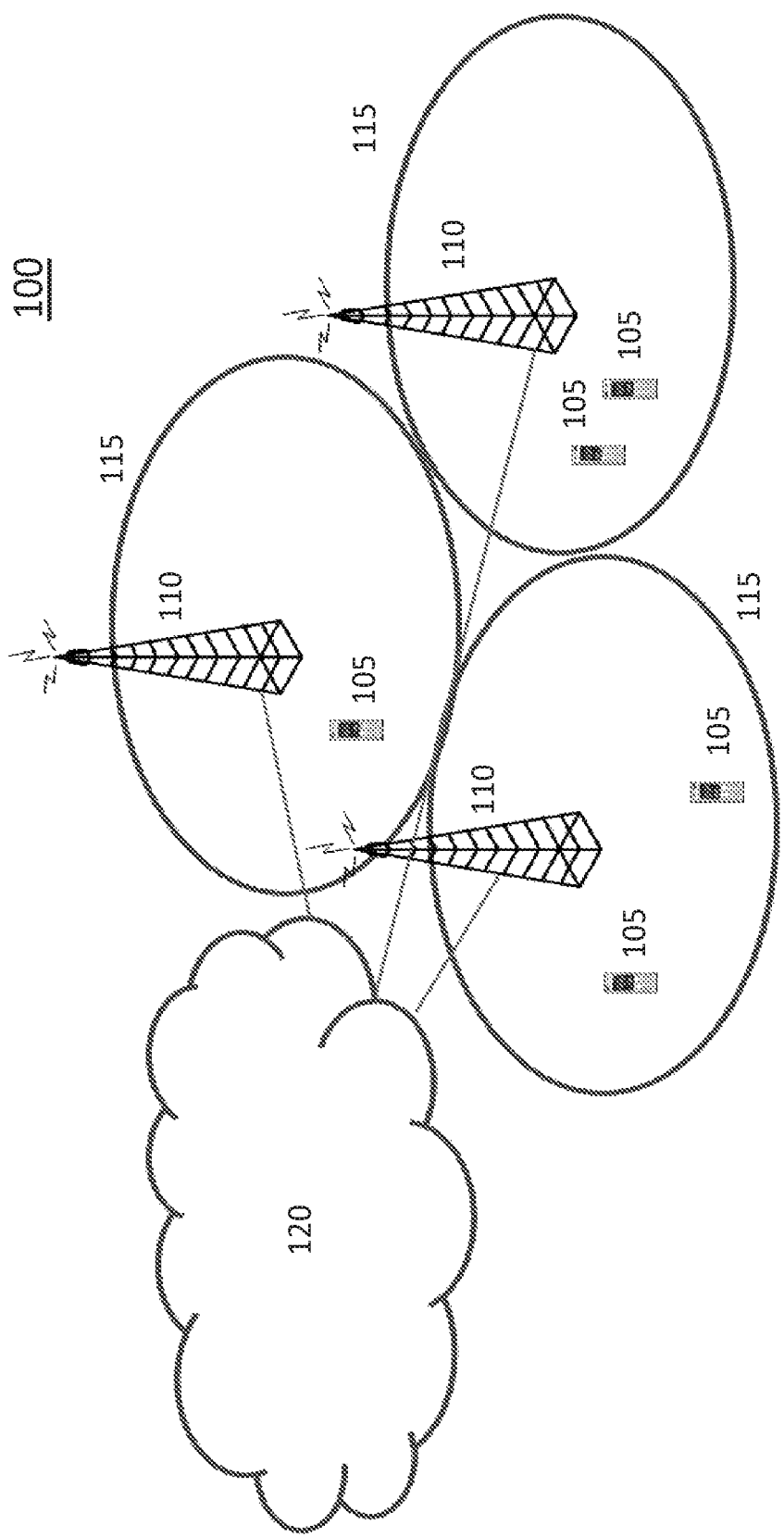
FIG. 1 is a diagram illustrating an LTE network according to some embodiments.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment. Any two or more embodiments described below may be combined in any way with each other. Moreover, certain details of the described embodiments may be modified, omitted, or expanded upon without departing from the scope of the described subject matter.

Note that terminology such as base station, 5G base station, NR base station, NodeB, gNode B or eNode B and UE should be considering non-limiting and does in particular not imply a certain hierarchical relation between the two; in general "NodeB" could be considered as device 1 and "UE" device 2, and these two devices communicate with each other over some radio channel. A generic term network node is used in some embodiments. The network node can be a base station, access point, RRH, RRU, radio network node, gNodeB, transmission reception point (TRP), NodeB or eNode B a core network node (e.g., MME, SON node, positioning node, MDT node, MCE, MBMS node etc). A generic term wireless device is used in some embodiments. The wireless device can be any type of UE such as LTE UE, NB-IoT UE, M2M UE, V2V UE, V2X UE, UE of particular category (e.g. UE category NB1, UE category M1, UE category 0 etc) etc. A generic term radio node used herein may be a network node or a wireless device.

In some embodiments, a term operating bandwidth (BW) is used. Over the operating BW the network node transmits to and/or receives signal from one or more UEs in a cell. The operating bandwidth is interchangeably called as channel bandwidth, system bandwidth, transmission bandwidth, cell bandwidth, cell transmission BW, carrier bandwidth etc. The operating BW may be expressed in different units. Examples of units are KHz, MHz, number of resource blocks, number of resource elements, number of subcarriers, number of physical channels, number of frequency resource units etc. The frequency channel or carrier frequency over which a RAT operates is enumerated or addressed by a channel number aka absolute radio frequency channel number (ARFCN) e.g. E-UTRA ARFCN (EARFCN) in LTE etc.

In some embodiments signal is used can be an uplink (UL) signal, a downlink (DL) signal or a sidelink (SL) signal. An uplink signal, which is transmitted by the wireless device, can be a physical signal or a physical channel. Examples of uplink physical signal are SRS, DMRS etc. Examples of uplink physical channel are PUCCH, PUSCH, NPUSCH, NPUCCH, PRACH, NPRACH etc. A DL signal, which is transmitted by the network node, can be a physical signal or a physical channel. Examples of DL physical signal are CRS, DMRS, PRS, CSI-RS etc. Examples of downlink physical channels are PDCCH, PDSCH, NPDSCH, NPDCCH, PMCH etc. A sidelink (SL) signal, which is transmitted by a UE capable of direct UE to UE operation (aka D2D operation, V2V operation etc), can be a physical signal or a physical channel. Examples of SL physical signal are SLSS, DMRS etc. Examples of SL physical channel are PSSCH, PSCCH, PSDCH, PSBCH etc.

The term "numerology" used herein may refer to any one or more attributes defining signal characteristics. Examples of such attributes are: subcarrier spacing, symbol duration, CP duration (aka CP length), time slot duration, subframe duration, number of subcarriers per physical channel, number of physical channels within the bandwidth, etc. A physical channel used herein refers to any time-frequency radio resource. Examples of physical channels are resource block (RB), physical RB (PRB), virtual RB (VRB) etc.

The term "time resource" used herein may correspond to any type of physical resource or radio resource expressed in terms of length of time. Examples of time resources are: symbol, time slot, subframe, short subframe, mini-slot, radio frame, TTI, interleaving time, etc.

The term FeMBSFN subframe may comprise, e.g., an MBSFN subframes configured according to eMBMS enhancements described in Section 2.1.1.1 (e.g., with new numerology, 1.25 kHz subcarrier spacing, in subframe #0, #4, #5, #9, etc.). The term mixed cell unicast/FeMBSFN subframes may comprise e.g. a cell transmitting one or more FeMBSFN subframes and one or more subframe with at least unicast data or PDSCH.

As used herein, a "radio node" is either a radio access node or a wireless device.

As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), and a relay node.

As used herein, a "core network node" is any type of node in a Core Network (CN). Some examples of a core network node include, e.g., a Mobility Management Entity (MME), a Packet Data Network (PDN) Gateway (P-GW), a Service Capability Exposure Function (SCEF), or the like.

As used herein, a "wireless device" is any type of device that is capable of wirelessly transmitting and/or receiving signals to/from another wireless device or to/from a network node in a cellular communications network to obtain has access to (i.e., be served by) the cellular communications network. Some examples of a wireless device include, but are not limited to, a User Equipment device (UE) in a 3GPP network, a Machine Type Communication (MTC) device, an NB-IoT device, an FeMTC device, etc.

As used herein, a "network node" is any node that is used and can correspond to any type of radio network node or any network node, which communicates with a UE and/or with another network node. Examples of network nodes are NodeB, MeNB, SeNB, a network node belonging to MCG or SCG, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O & M, OSS, SON, positioning node (e.g. E-SMLC), MDT, etc.

As used herein, the non-limiting term user equipment (UE) is used and it refers to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, ProSe UE, V2V UE, V2X UE, etc.

As used herein, the non-limiting term WAN (wireless access network or RAN, radio access network) node can be a UE or a network node (e.g. access point, BS etc.) The WAN node may be interchangeably called as cellular node, NW source node etc.

Note that the description given herein focuses on a 3GPP cellular communications system and, as such, 3GPP LTE terminology or terminology similar to 3GPP LTE terminology is oftentimes used. However, the concepts disclosed herein are not limited to LTE or a 3GPP system. Moreover, in the description herein, reference may be made to the term "cell;" however, particularly with respect to Fifth Generation (5G) concepts, beams may be used instead of cells and, as such, it is important to note that the concepts described herein are equally applicable to both cells and beams.

According to some embodiments, the MBMS can be provided on an MBMS dedicated carrier frequency or on a shared carrier frequency (i.e. shared between MBMS and unicast). In the former case, all subframes can be used for MBMS signal transmission. In the latter case, the MBMS may be shared with unicast service in time division multiplex manner i.e. different subframes within a radio frame are used for MBMS and unicast services. The MBMS subframes are configurable by the network node. The information regarding which subframes are configured for MBMS in a cell is signaled by the network node. Examples of subframes which can be configured for MBMS, i.e. as MBSFN subframes, are subframes #1, 2, 3, 6, 7 and 8 for LTE FDD and subframes #3, 4, 7, 8 and 9 for LTE TDD. This means subframes #0 and #5 are always unicast subframes in both FDD and TDD. In addition, in case of LTE FDD the subframes #4 and 9 and in case of LTE TDD subframes #1, 2 and 6 are also unicast subframes. The unicast subframes are used only for unicast services.

An MBSFN subframe consists of a control region in the beginning and an MBSFN region used for transmission of MCH. The control region has a length of one or two OFDM symbols using normal 4.7 µs cyclic prefix length, and an MBSFN region that, depending on the content, can have different structures.

The physical layer of MBSFN signal is based on OFDM with 15 kHz subcarrier spacing with extended cyclic prefix 16.7 µs (in shared mode, a.k.a mixed mode), or 7.5 kHz subcarrier spacing with long cyclic prefix 33.3 µs (in dedicated mode).

The eNode B (eNB) may be configured with MBMS scheduling information by a network entity called as Multi-cell/multicast Coordination Entity (MCE). MCE may be a separate network node or may reside in an eNB. The MCE and eNB communicates over M2 interface. The M2 interface is a logical interface between the eNB and the MCE.

Further enhancements are provided for more efficient use of MBMS in large inter-site distance scenarios. For example, a new symbol length of 800 µs with a CP length of 200 µs may be adopted under a relevant standard for enhanced MBMS (eMBMS). For both the 1.25 kHz subcarrier spacing numerology and 7.5 kHz subcarrier spacing numerology, a UE can assume that the unicast control region is never present in the MBSFN subframe.

For dedicated mode, supporting 15 kHz, 7.5 kHz and 1.25 kHz numerologies, SI may be broadcasted in CAS (Cell Acquisition Subframe) based on discovery reference signal with fixed periodicity of 40 ms.

For mixed mode, supporting 15 kHz and 1.25 kHz numerologies (7.5 kHz may also be added later), SI is provided in subframes that have unicast control region. For such mode of operations, an increased number of MBSFN subframes may be used (subframes 0 and 5 will be always non/MBSFN and cells will be configured as SCell if subframes 4 and 9 are configured as MBSFN subframes and/or use the 1.25 kHz numerology for eMBMS).

In multicarrier or carrier aggregation (CA) operation the UE is able to receive and/or transmit at least data (also possibly higher layer signaling) to and from more than one serving cells. The carrier of each serving cell is generally called as a component carrier (CC). The term carrier aggregation (CA) is also called (e.g. interchangeably called) "multi-carrier system", "multi-cell operation", "multi-carrier operation", "multi-carrier" transmission and/or reception. One of the CCs may be designated as the primary component carrier (PCC), a primary carrier and/or an anchor carrier. The remaining CCs may be designated as secondary component carrier (SCC), secondary carriers and/or supplementary carriers. The serving cell on PCC may be referred to as a primary cell (PCell) or primary serving cell whereas serving cell on SCC may be referred to as a secondary cell (SCell) or secondary serving cell. The PCell may exist in both uplink and downlink directions. In case there is single UL CC, the PCell must be on that CC. The CCs can be co-located in the same geographical location or site, can be non-co-located and/or any combination thereof. All the CCs in the CA can belong to the same duplex mode (e.g. FDD CA or TDD CA). Some embodiments provide that some of the CCs can belong to FDD, while others may belong to TDD, which may be referred to as TDD-FDD CA.

Dual connectivity (DC) is a special case of CA where the CCs assigned to the UE may operate from different base station sites, e.g. different eNodeBs, such as a master eNB (MeNB) and a secondary eNB (SeNB). At least one serving cell in MeNB called PCell and one serving cell in SeNB called PSCell contain both UL and DL. The serving cells operated by MeNB belong to master cell group (MCG) whereas serving cells operated by SeNB belong to secondary cell group (SCG). There can be one or more secondary cells (SCell) attached to either MeNB and/or SeNB.

The described embodiments may be implemented in any appropriate type of communication system supporting any suitable communication standards and using any suitable components. As one example, certain embodiments may be implemented in an LTE network, such as that illustrated in FIG. 1. Although certain embodiments are described with respect to LTE systems and related terminology, the disclosed concepts are not limited to LTE or a 3GPP system. Additionally, although reference may be made to the term "cell", the described concepts may also apply in other contexts, such as beams used in Fifth Generation (5G) systems, for instance.

As referred to herein, a CA capability may implement methods for determining and implementing a CA configuration for receiving multicast (e.g., eMBMS) data in a wireless communication network. In some embodiments, methods implemented in a wireless device may include a first operation in which a wireless device indicates to another node (e.g., a network node) the wireless device's capability related to support of one or more CA configurations. In some embodiments, such CA configurations may include a given quantity of carriers during dedicated (e)MBMS operation mode and/or with mixed cells including unicast and FeMBSFN subframes.

In the first operation, the wireless device may indicate to another node (e.g., network node) the wireless device's capability related to support of one or more CA configurations including a certain number of carriers during dedicated MBMS mode and/or with mixed MBMS mode (e.g. mixed cells comprising unicast and FeMBSFN subframes) of operation.

The capability may further include, e.g., any one or more of: support for at least K carriers and/or bands with mixed cells (e.g., N may be not larger than the total number of carriers for different operation types the UE can aggregate for CA); support for at least R carriers and/or bands in total in CA, including the carriers for enhanced MBMS operation or MBMS operation in general; support for at least L carriers and/or bands in CA, excluding the carriers for enhanced MBMS operation or MBMS operation in general; support for at least M carriers and/or bands for dedicated MBMS operation in parallel (e.g., may be not included in K since the carriers for dedicated MBMS operation may be not possible to aggregate in a traditional CA sense implying CA for unicast traffic); support for at least P carriers and/or bands with mixed cells using a different numerology in MBSFN subframes than in unicast subframes; support for at least S carriers and/or bands for which multicast data, e.g., (e)MBMS, can be aggregated, and support for at least Q MBSFN areas in total or MBSFN areas with specific properties or specific MBSFN configurations, wherein the areas are broadcasted via one or more dedicated carriers and/or one or more mixed cells.

The capability may be provided, e.g., upon a request from another node or in an unsolicited way, upon a triggering condition or triggering event, or upon determining the need to receive (e)MBMS service. In some embodiments, the capability may comprise, e.g., an explicit list of supported or acceptable configurations or a rule to derive such, a number or list of mixed SCells or carriers with mixed cells and/or dedicated (e)MBMS operation, etc.

A second operation may include determining the need or interest to receive eMBMS on at least N (e.g., =1, 2, . . . ) carriers. The carriers may include dedicated mode and/or mixed mode (i.e. mixed cells with unicast and FeMBSFN subframes). In some embodiments, the wireless device may further indicate the determined need or interest to another node (e.g., network node).

In the second operation, the wireless device may determine the need or interest to receive eMBMS on at least N (e.g., N=1, 2, . . . ) carriers. In some embodiments, the carriers may operate in dedicated mode, i.e., containing only MBMS signals such as subframes with CAS and FeMBMS signals. In some embodiments, the carriers may operate in mixed mode in which case the carriers may include carriers from mixed cells with unicast and FeMBSFN subframes. In some embodiments, a certain number (N1) of carriers can operate in dedicated mode whereas another certain number (N2) of carriers can operate in mixed mode, where N1+N2=N or N1+N2>=N.

The determining of the need or interest to receive eMBMS may be indicated, e.g., by another node, a higher and/or different layer and/or application. The application for using eMBMS in the wireless device may further be configured and/or initiated by the higher layers, which in turn may receive a request from an internal module and/or from another node. Examples of internal modules are SIM card, USIM card etc. Examples of another node are radio network node, core network node, another UE etc. The wireless device may further determine that at least some of the N carriers may operate in dedicated mode and/or in mixed mode comprising of mixed cells with unicast and FeMBSFN subframes, wherein the determining may be e.g., based on one or more of: history stored in the wireless device, message or broadcast information from the network, wireless device measurements, pre-defined rule or table, etc.

In some embodiments, the wireless device may further indicate the determined need or interest to another node (e.g., radio network node or another network node).

In some embodiments, a third operation includes determining an acceptable CA configuration comprising at least K (0<K<=N) carriers of dedicated mode and/or of mixed mode type. In the third operation, the wireless device may determine an acceptable CA configuration comprising at least K (K<=N) carriers if the need or interest to receive eMBMS on at least N carriers is determined in the first operation. The N carriers may comprise N1 dedicated mode (e.g. comprising only FeMBMS and CAS subframes) carriers and/or N2 mixed mode comprising mixed cell carriers. When a carrier may not be aggregated in terms of traditional CA for unicast data, as in the case with dedicated (e)MBMS mode, the phrase, "CA configuration comprising K carriers which may further comprise a dedicated carrier," or the like may be used to denote, e.g.: a UE configuration for parallel operation of the aggregated carriers (with unicast and/or mixed cells) and the dedicated carrier, or a UE configuration for CA of multicast data.

In some embodiments, K=K1 if all carriers (N1) for receiving eMBMS operate in a dedicated mode. In some embodiments, K=K2 if all carriers (N2) for receiving eMBMS operate in mixed mode. In some embodiments, K=K3 if a certain number of carriers (N1) for receiving eMBMS operate in dedicated mode, while a certain number of carriers (N2) for receiving eMBMS operate in mixed mode.

In some embodiments, the acceptable CA configuration may further include a wireless device configuration that is acceptable from the wireless device resources' point of view and/or wireless device capability such that the wireless device is configured to use (e)MBMS on at least one carrier frequency.

In some embodiments, if the acceptable CA configuration determined by the wireless device includes a number of carriers that is less than the configured number of carriers for CA operation then the UE may deconfigure and/or deactivate one or more carriers in order to be able to receive at least certain number of CCs for CA and/or a certain number of carriers for eMBMS. The wireless device is configured for a certain number of carriers (e.g. PCC and one or more SCCs) for CA configuration by the network node. The deconfiguration/deactivation herein means that the wireless device will not transmit and/or receive channels/signals (any or of a specific type such as control channels) on deconfigured/deactivated carriers. The deconfiguring/deactivating in some examples may also be followed by configuring/activating the deconfigured/deactivated carrier again responsive to the wireless device resources (radio, hardware, software) not being needed any more for (e)MBMS, which may also comprise (e)MBMS with mixed cells.

In some embodiments, determining an acceptable CA configuration may be based on one or more of: a pre-defined rule, requirement, and/or wireless device capability. The wireless device capability can be expressed in terms of maximum CA configuration supported by the wireless device. The CA may denote aggregation of unicast and/or multicast data. For example, the wireless device may indicate that it is capable of H1 number of CA configured DL serving cells and H2 number of UL serving cells. The indication may be pre-defined or signaled by the wireless device to the network node. The CA configuration supported by the wireless device may also be interchangeably referred to as a band combination, multicarrier configuration or combination etc.

In some embodiments, determining an acceptable CA configuration may include selecting from a pre-defined and/or configured set of acceptable CA configurations. In some embodiments, determining an acceptable CA configuration may be based on an acceptable configuration or characteristics of the acceptable configuration received from the network node.

In some embodiments, the wireless device may further indicate the determined acceptable CA configuration to another node (e.g., network node).

Some non-limiting example characteristics of acceptable CA configurations and rules for determining acceptable CA configurations may include one or any suitable combination of: a maximum number of M CCs with mixed cells (e.g., M=1 or 2), a maximum number of M1 CCs with X % of FeMBSFN subframes per carrier or mixed cell, or a maximum number of M2 carriers with Y % of FeMBSFN subframes (e.g., M1>M2, and X %<Y %); a maximum number of M1 CCs with X % of FeMBSFN subframes without PDCCH per carrier or mixed cell, or at most M2 carriers with Y % of FeMBSFN subframes without PDCCH (e.g., M1>M2, and X %<Y %), at most R-M CCs without mixed cells (e.g., R=5 is the maximum general CA capability of the wireless device), at most M1 activated mixed SCells, at most M2 deactivated mixed SCells, at most M3 mixed SCells where the FeMBSFN subframes are based on a specific numerology (e.g., with a subcarrier spacing smaller than a threshold such as 1.25 kHz), a CA configuration comprising one or more mixed cells, meeting one or more performance requirements, e.g., the total interruption impact (e.g., time or % of lost messages) to a serving carrier due to mixed cells is below a certain threshold, a CA configuration in which a mixed serving cell (e.g., SCell) with FeMBSFN based on subcarrier spacing 1.25 kHz is on f2, another serving cell (e.g., PCell) is on f1, and the difference between f2 and f1 is below a threshold, the number of CCs with overlapping in time, at least in part, FeMBSFN subframes is below a threshold, the number of CCs with mixed serving cells with FeMBSFN subframes with no PDCCH is below a threshold, the number of operated dedicated carriers for (e)MBMS is below a threshold, the number of cell and/or carriers and/or bands with (e)MBMS data received by the UE is below a threshold, the number of cell and/or carriers and/or bands with configured MBSFN subframes is below a threshold, and the number of MBSFN areas received by the UE in parallel is below a threshold.

If the UE is configured with CA then the UE may be allowed to receive eMBMS (e.g. in dedicated mode and/or on mixed mode) on at least P1 number of carriers (other than in CA configuration) provided that the UE is capable of CA configuration comprising of at least Q1 carriers. In one example P1=1 and Q1=3 DL CCs. In another example P1=2 and Q1=4 DL CCs. In another example P1=1 and Q1=2 DL CCs. If the UE is configured with CA comprising of Q3 carriers and the UE maximum capability for CA is Q4 carriers (Q4>Q3) then the UE is allowed to receive eMBMS (e.g. on dedicated mode and/or on mixed mode) on not more than P2=(Q4-Q3). The parameter P2 may further depend on the type of eMBMS mode e.g. P21 and P22 are applicable for receiving eMBMS over P21 and P22 carriers respectively. As an example, P21<P22 since the UE needs more resources for receiving eMBMS on dedicated carrier. P21<P2; P22<P2. In yet another example parameter P2 may further depend on numerology used on carriers used for receiving eMBMS. For example, P2=P23 and P2=P24 if subcarrier spacings used for receiving on a first carrier (F1) and a second carrier (F2) are 15 KHz and 1.25 KHz respectively e.g. P23<P24.

Some embodiments provide that the UE is allowed to receive eMBMS on at least one carrier (F1) provided that the UE can at least operate on Q2 number of carries with unicast operation e.g. Q2=1.

If the UE operates or is expected to operate eMBMS on at least one carrier (other than those in unicast CA configuration) and is also configured with CA configuration with Q3 number of carriers then the UE may adapt or determine a CA configuration and/or carriers for receiving eMBMS based on one or more of the following rules: deconfigure any one or more carriers on which the UE can receives eMBMS, deconfigure a particular type of one or more carriers on which the UE can receive eMBMS based on one or more of the following rules: a carrier of a particular numerology, e.g. deconfigure a carrier with subcarrier spacing of 15 KHz, carrier of the largest possible subcarrier spacing etc., a carrier of a particular frequency, e.g. deconfigure a carrier of bandwith highest frequency, a carrier of a particular channel bandwidth, e.g. deconfigure a carrier of band with smallest channel bandwidth, a carrier based on traffic activity, e.g. deconfigure a carrier on which the activity is lowest, where examples of traffic activity include bit rate, throughput etc., deconfigure or deactivate any one or more CCs belonging to the configured CA.

A particular type of one or more CCs belonging to the CA configuration may be deconfigured or deactivated based on only one or more SCC, any CC other than PCC, any CC other than PCC and PSCC, a CC which is configured in a particular timing advance group (TAG) e.g. sTAG, a CC belonging to a TAG that contains largest number of CCs, a CC based on UE radio architecture e.g. CCs that share the radio chain with the carriers configured for receiving eMBMS e.g. CC adjacent to eMBMS carrier, a CC belonging to particular band e.g. a CC belonging to a band with highest carrier frequency among all the bands of all CCs in the CA configuration (e.g., if CA configuration comprises X1 number of CCs in 900 MHz and X2 number of CCs in 1800 MHz, then deconfigure one of the CC in 1800 MHz), a CC whose signal quality at the wireless device is below a certain threshold or is the lowest/worst, e.g. an SCC whose SCell's received signal quality at the wireless device is below −3 dB, where examples of signal quality include SNR, SINR, RSRQ etc., and/or a CC on which the traffic activity is lowest or is below certain threshold, where examples of traffic activity are buffer size, user bit rate, throughput etc.

A particular type of CCs belonging to the CA configuration may be deconfigured or deactivated based on channel bandwidth (for example, the wireless device deconfigure or deactivate CC which has the smallest channel BW or the CC whose channel BW is below threshold), and/or a CC which is allowed to be deconfigured or deactivated that is based on a pre-defined rule. The rule can be any of the above rules described above in which a CC is allowed to be deconfigured or deactivated by the wireless device is based on an indication received from the network node. For example, in cases in which the network node configures the wireless device regarding which of the carriers are allowed to be deconfigured or deactivated by the wireless device when the wireless device receives the eMBMS data on another carrier.

In some embodiments, One or more of the CCs having the CA configuration may be deconfigured or deactivated provided the wireless device is allowed to do so by the network node. For example, such cases may include configuration values of 0 and 1 that mean that the wireless device is not allowed and allowed, respectively, to deconfigure or deactivate CC(s).

If an acceptable CA configuration has been determined by the wireless device, the wireless device may proceed with the next operations. If no acceptable CA configuration has been obtained by the wireless device in any of the possible ways, the wireless device may indicate this result to another node (e.g., radio network node). In another example, the wireless device may reattempt to obtain an acceptable CA configuration, e.g., after a certain time.

A fourth operation may include configuring the acceptable CA configuration and a fifth operation may include performing one or more operational tasks under the configured acceptable CA configuration. Examples may include indicating results of acceptable CA configuration determined by the wireless device to another node.

In the fourth operation, the wireless device may configure the acceptable CA configuration based on the determined applicable CA configuration. The term CA may include aggregation of carriers with unicast subframes. In some embodiments, the applicable CA configuration may even include a wireless device configuration with one or more dedicated carriers and at least one serving cell for unicast data. In some examples, the carriers with (e)MBMS may also be aggregated by the wireless device to receive multicast data.

The configuring may further include configuring/updating/adding to/removing from a set of CC, (de)activating one or more SCells, setting up one or more serving cells, replacing a non-mixed cell with a mixed cell in a set of serving cells or vice versa, changing a PCell, creating and/or extending a set or a list of one or more UE-operated carriers with multicast data, etc.

In a fifth operation, the wireless device may perform one or more operational tasks under the configured acceptable CA configuration. Example operational tasks include one or a combination of receiving eMBMS in FeMBSFN subframes, receiving unicast data in one or more serving cells, performing a measurement in unicast subframes meeting a pre-defined performance requirement, performing and/or logging a measurement in FeMBSFN subframes meeting a pre-defined performance requirement, performing measurements for MDT purpose, indicating (e.g., by transmitting, signaling, or sending) to another node results of the adaptation/determining of the acceptable configuration and/or the adaptation of the set of carriers and/or bands for receiving eMBMS performed by the wireless device. The adaptations are described above with reference to the operation in which examples of other nodes include another wireless device or a network node. Examples of indicating the results include providing an indicator of whether or not adaptation is done for CA configuration and/or for eMBMS carriers, and/or providing information about carriers that have been deconfigured and/or deactivated by the UE.

Some embodiments provide that a network node supporting a CA capability in a wireless device may implement methods for determining and implementing a CA configuration for receiving eMBMS data in a wireless communication network. An example method implemented in a network node may include a first operation of obtaining a wireless device's capability related to support of one or more CA configurations with a certain minimum number of carriers with dedicated and/or mixed mode of operation (e.g., comprising cells comprising unicast and FeMBSFN subframes). A second operation includes obtaining an indication of a need or interest of a wireless device to receive eMBMS on at least N (e.g., N=1, 2, . . . ) carriers. The carriers may comprise mixed cells with unicast and FeMBSFN subframes. In a third operation, an acceptable CA configuration is determined, the configuration comprising at least K (K<=N) carriers of dedicated and/or mixed mode type. In a fourth operation, the acceptable CA configuration is configured. In a fifth step, a result of performing by the wireless device one or more operational tasks under the configured acceptable CA configuration is obtained.

In the first operation, the network node may obtain a wireless device's capability related to support of one or more CA configurations with a certain minimum number of carriers with dedicated and/or mixed mode of operation (e.g., comprising cells comprising unicast and FeMBSFN subframes). In one embodiment, the obtaining may be based on an indication from wireless device or from another network node. In another embodiment, the obtaining may be based on observing wireless device behavior or wireless device measurements.

In the second operation, the network node may obtain an indication of the wireless device's need or interest to receive eMBMS on at least N (e.g., N=1, 2, . . . ) carriers. The carriers may comprise mixed cells with unicast and FeMBSFN subframes and/or carriers with dedicated mode. The indication may be received from the wireless device or may be a message from another node (e.g., O&M, MBMS controlling node, network controller).

In the third operation, the network node may determine an acceptable CA configuration comprising at least K (K<=N) carriers with dedicated and/or mixed mode of operation. In one embodiment, the determining may be based on one or more o: a pre-defined rule, requirement, wireless device indication or message, and/or wireless device capability. In another embodiment, the determining may include selecting from a pre-defined or configured set of acceptable CA configurations. In yet another embodiment, the determining may be based on a configuration received from the network or preferred or determined configuration from the wireless device. The rules and characteristics of the acceptable configurations may be similar to those described above with reference to the third operation implemented in the wireless device.

In the fourth operation, the network node may configure the acceptable CA configuration in the wireless device. The configuring may be performed by, e.g., sending a configuration message to the wireless device and/or a message with an action related to the configuring (e.g., (de)activation request).

If no acceptable CA configuration was determined, the network node may reattempt to obtain an acceptable CA configuration, e.g., after a certain time. In another example, the network node may also indicate to the wireless device, implicitly or explicitly, that no acceptable CA configuration was obtained for the wireless device.

In the fifth operation, the network node may obtain a result of performing by the wireless device one or more operational tasks under the configured acceptable CA configuration. Example tasks include the tasks described above with reference to the fifth operation implemented in the wireless device. The obtaining of a result may be performed by, e.g., receiving one or more of: a message, operation report (e.g., measurement report), a radio signal/channel transmission, confirmation or acknowledgement of the applied acceptable configuration, a pre-defined message upon a successful configuration of the acceptable configuration from the wireless device, observing wireless device behavior, etc.

Reference is now made to FIG. 1, which is a diagram illustrating an LTE network according to some embodiments. A communication network 100 comprises multiple wireless devices 105 and multiple radio access nodes 110. Communication network 100 is organized into cells 115, which are connected to a core network 120 via corresponding radio access nodes 110. Radio access nodes 110 are capable of communicating with wireless communication devices 105 along with any additional elements suitable to support communication between wireless communication devices or between a wireless communication device and another communication device (such as a landline telephone).

Figure 2A:
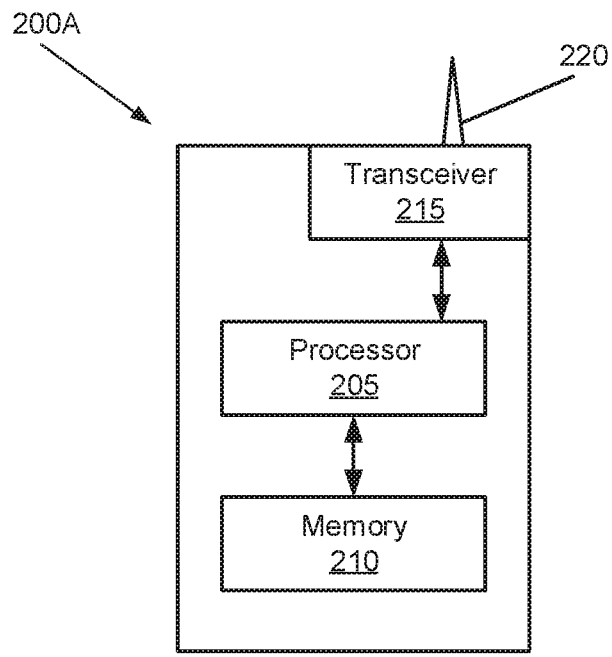
FIGS. 2A and 2B are diagram illustrating wireless devices according to some embodiments.
Figure 2B:
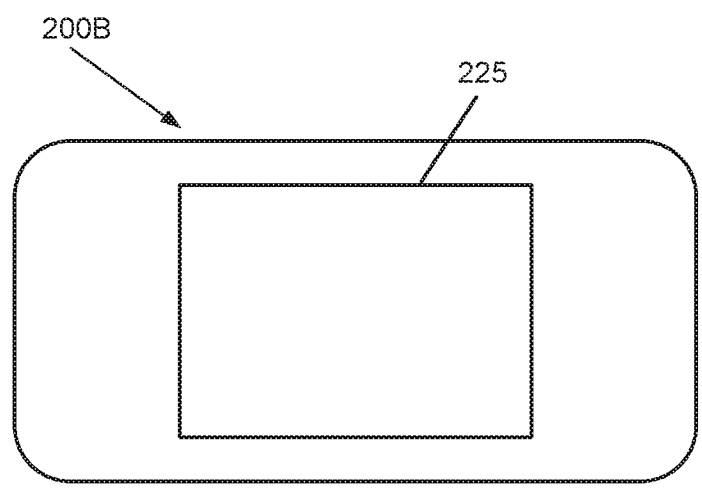

Although wireless devices 105 may represent communication devices that include any suitable combination of hardware and/or software, these wireless devices may, in certain embodiments, represent devices such as an example wireless device illustrated in greater detail by FIGS. 2A and 2B. Similarly, although the illustrated radio access node may represent network nodes that include any suitable combination of hardware and/or software, these nodes may, in particular embodiments, represent devices such those illustrated in greater detail by FIGS. 3A, 3B and 4.

The wireless communication device 200A, which may be referred to herein as a UE 200, (also referred to as a wireless terminal, a wireless communication device, a wireless communication terminal, user equipment, a user equipment node/terminal/device, etc.) may be configured to provide operations according to embodiments of inventive concepts. Referring to FIG. 2A, a wireless communication device 200A includes a processor circuit 205. Also referred to as a processor, (e.g., Central Processing Units [CPUs], Application Specific Integrated Circuits [ASICs], Field Programmable Gate Arrays [FPGAs], and/or the like), a memory 210, a transceiver circuit 215, also referred to as a transceiver, and an antenna 220.

The processor 205 may be coupled to the transceiver 215 and the memory 210. The memory 210 may include computer readable program code that when executed by the processor 205 causes the processor 205 to perform operations according to embodiments disclosed herein for a wireless communication device 200A. According to other embodiments, processor 205 may be defined to include memory so that a separate memory circuit is not required. The wireless communication device 200A may also include an interface (such as a user interface) coupled with processor 205.

As discussed herein, operations of the wireless communication device 200A may be performed by the processor 205 and/or transceiver 215. For example, processor 205 may control transceiver 215 to transmit communications through transceiver 215 over a radio interface to another node and/or to receive communications through transceiver 215 from another node over a radio interface. Moreover, modules may be stored in memory 210, and these modules may provide instructions so that when instructions of a module are executed by processor 205, processor 205 performs respective operations (e.g., operations discussed below with respect to example embodiments).

In certain embodiments, some or all of the functionality described as being provided by UEs, MTC or M2M devices, and/or any other types of wireless communication devices may be provided by the device processor executing instructions stored on a computer-readable medium, such as the memory shown in FIG. 2A. Some embodiments include additional components beyond those shown in FIG. 2A that may be responsible for providing certain aspects of the device's functionality, including any of the functionality described herein.

Referring to FIG. 2B, a wireless communication device 200B comprises at least one module 225 configured to perform one or more corresponding functions. Examples of such functions include various method steps or combinations of method steps as described herein with reference to wireless communication device(s). In general, a module 225 may comprise any suitable combination of software and/or hardware configured to perform the corresponding function. For instance, in some embodiments a module 225 comprises software configured to perform a corresponding function when executed on an associated platform, such as that illustrated in FIG. 2A.

Figure 3B:
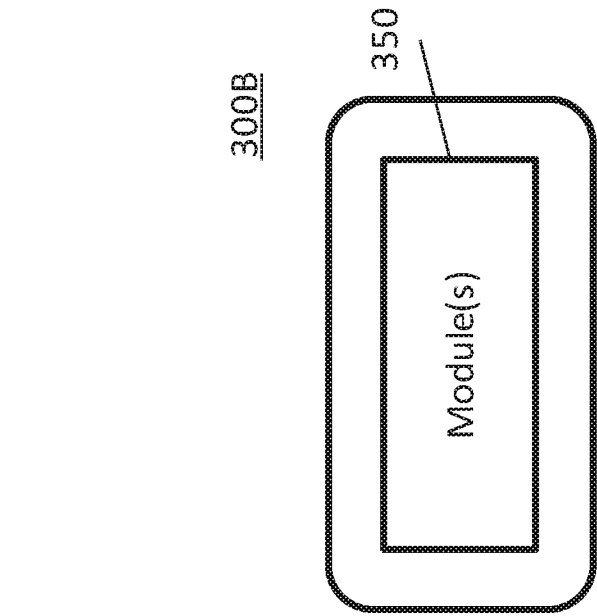
FIGS. 3A and 3B, which are schematic block diagrams illustrating radio access nodes corresponding to some embodiments herein.
Figure 3A:
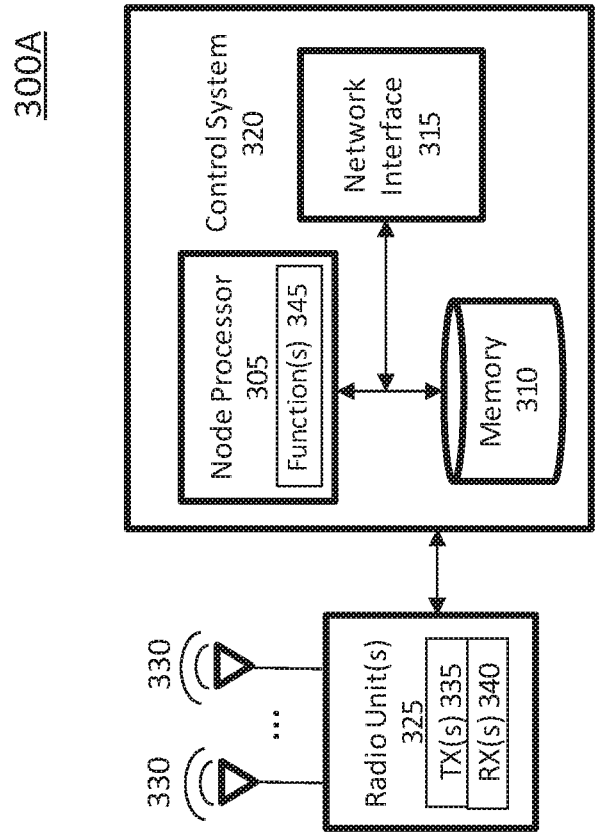

Reference is now made to FIGS. 3A and 3B, which are schematic block diagrams illustrating radio access nodes corresponding to some embodiments herein. Referring to FIG. 3A, a radio access node 300A includes a control system 320 that includes a node processor 305 (e.g., Central Processing Units (CPUs), Application Specific Integrated Circuits (ASICs), Field Programmable Gate Arrays (FPGAs), and/or the like), memory 310, and a network interface 315. In addition, radio access node 300A includes at least one radio unit 325 including at least one transmitter 335 and at least one receiver coupled to at least one antenna 330. In some embodiments, radio unit 325 is external to control system 320 and connected to control system 320 via, e.g., a wired connection (e.g., an optical cable). However, in some other embodiments, radio unit 325 and potentially the antenna 330 are integrated together with control system 320. Node processor 305 operates to provide at least one function 345 of radio access node 300A as described herein. In some embodiments, the function(s) are implemented in software that is stored, e.g., in the memory 310 and executed by node processor 305.

In certain embodiments, some or all of the functionality described as being provided by a base station, a node B, an enodeB, and/or any other type of network node may be provided by node processor 305 executing instructions stored on a computer-readable medium, such as memory 310 shown in FIG. 3A. In some embodiments, a radio access node 300 may include additional components to provide additional functionality, such as the functionality described herein and/or related supporting functionality.

Referring to FIG. 3B, a radio access node 300B includes at least one module 350 configured to perform one or more corresponding functions. Examples of such functions include various method steps and/or operations or combinations of method steps and/or operations as described herein with reference to radio access node(s). In general, a module 350 may include any suitable combination of software and/or hardware configured to perform the corresponding function. For instance, in some embodiments a module includes software configured to perform a corresponding function when executed on an associated platform, such as that illustrated in FIG. 3A.

Figure 4:
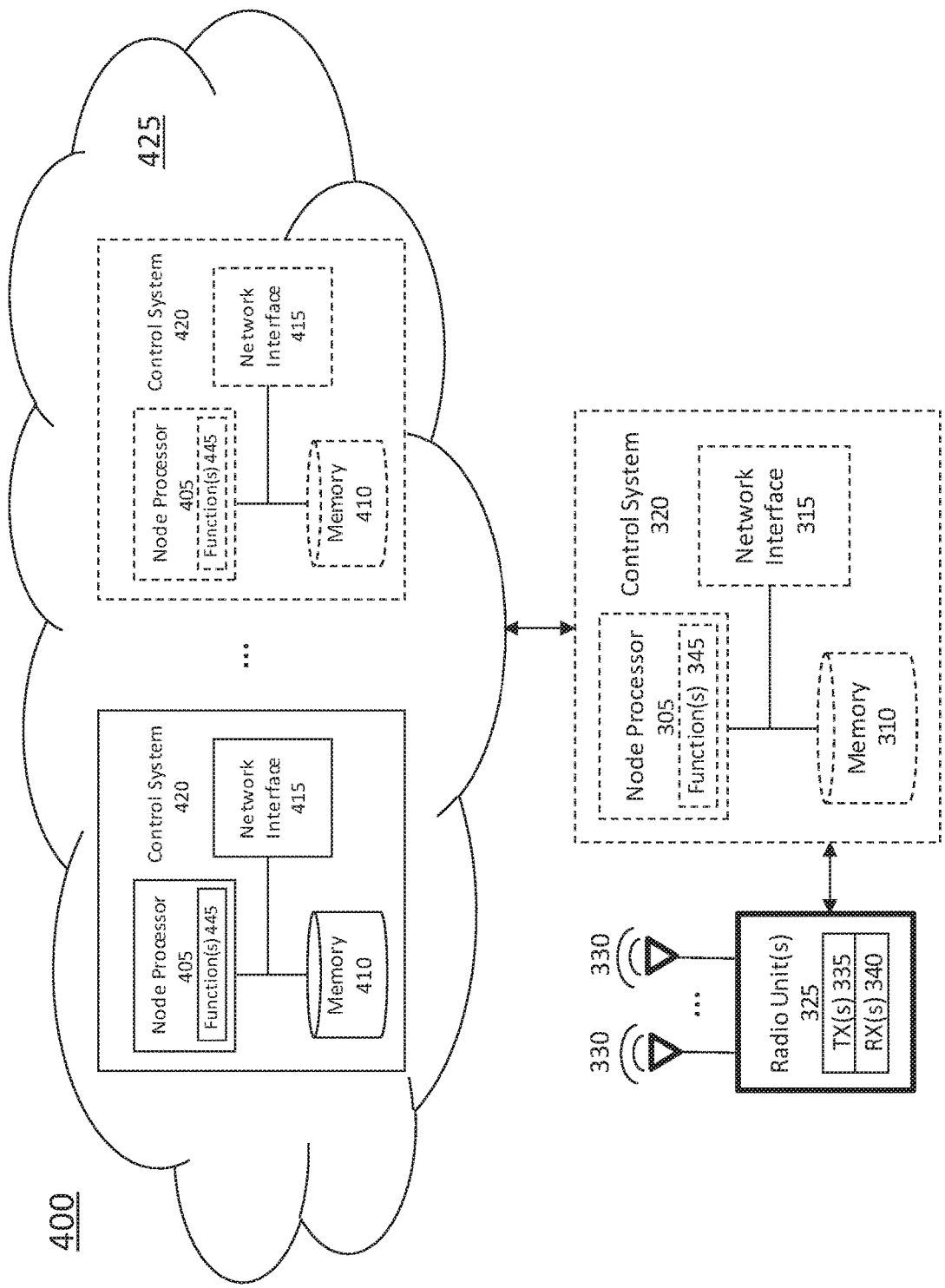
FIG. 4 is a block diagram that illustrates a virtualized radio access node according to some embodiments herein.
Figure 5:
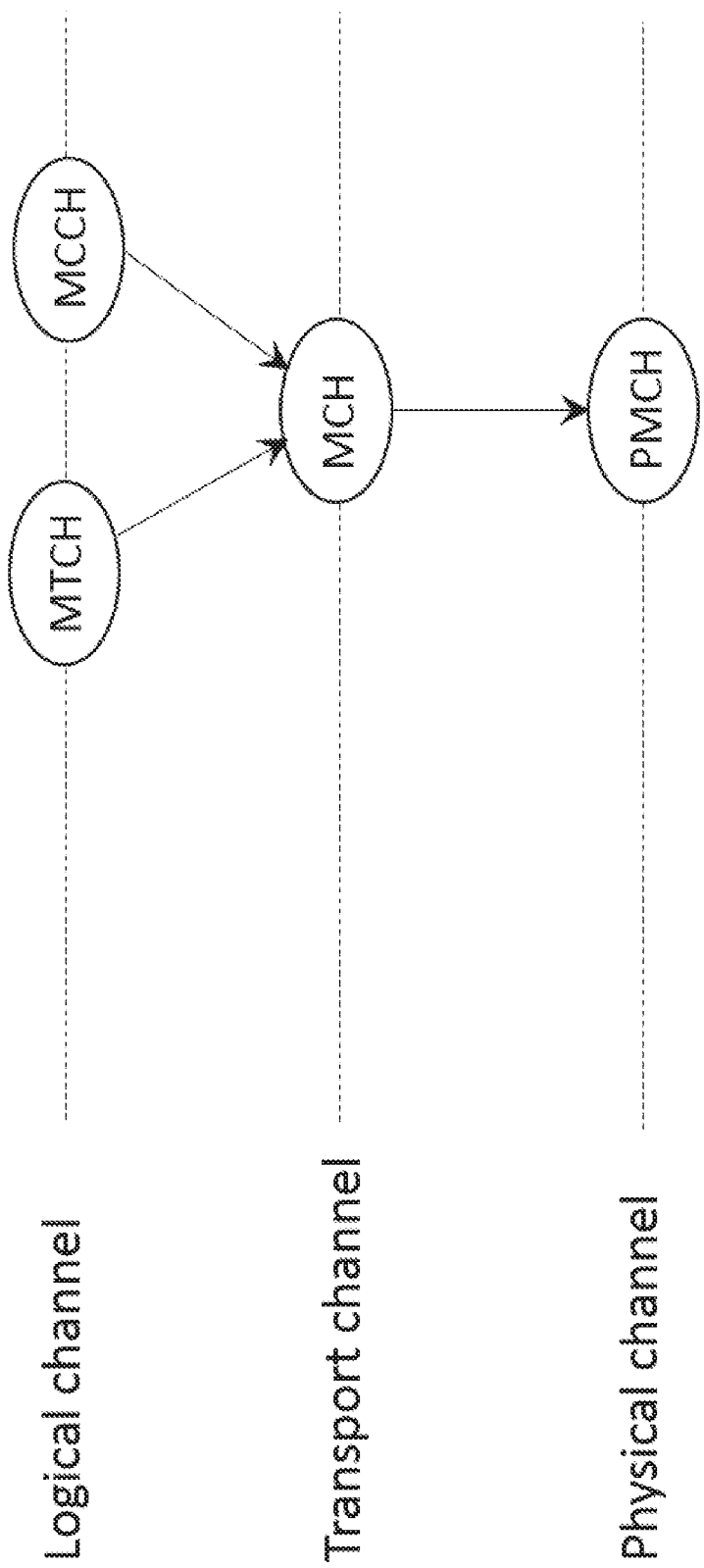
FIG. 5, which is a block diagram illustrating MBSFN channel mapping across logical, transport and physical channels.

FIG. 4 is a block diagram that illustrates a virtualized radio access node 400 according to some embodiments herein. The concepts described in relation to FIG. 4 may be similarly applied to other types of network nodes. Further, other types of network nodes may have similar virtualized architectures. As used herein, the term "virtualized radio access node" refers to an implementation of a radio access node in which at least a portion of the functionality of the radio access node is implemented as a virtual component(s) (e.g., via a virtual machine(s) executing on a physical processing node(s) in a network(s)).

Referring to FIG. 4, radio access node 400 comprises control system 320 as described above regarding FIG. 3A.

Control system 320 is connected to one or more processing nodes 420 coupled to or included as part of a network(s) 425 via network interface 315. Each processing node 420 may include one or more processors 405 (e.g., CPUs, ASICs, FPGAs, and/or the like), memory 410, and a network interface 415.

In some embodiments, functions 345 of radio access node 300A described herein may be implemented at the one or more processing nodes 420 and/or distributed across control system 320 and the one or more processing nodes 420 in any desired manner. In some embodiments, some or all of the functions 345 of radio access node 300A described herein are implemented as virtual components executed by one or more virtual machines implemented in a virtual environment(s) hosted by processing node(s) 420. Additional signaling and/or communication between processing node(s) 420 and control system 320 may be used in order to carry out at least some of the desired functions 345. As indicated by dotted lines, in some embodiments control system 320 may be omitted, in which case the radio unit(s) 325 communicate directly with the processing node(s) 420 via an appropriate network interface(s).

Figure 6:
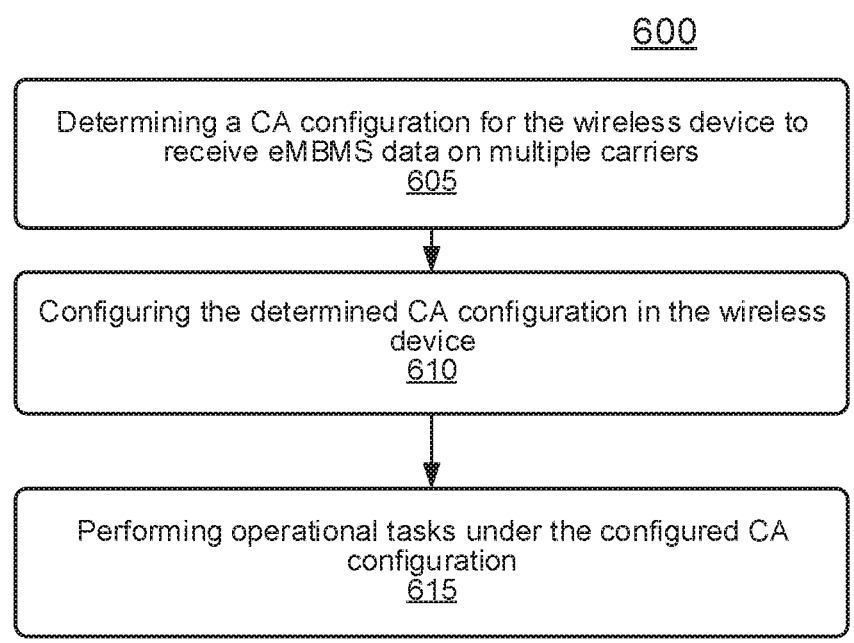
FIGS. 6-21 are flowcharts illustrating operations of methods of operating of a wireless device according to some embodiments herein.

FIGS. 6-21 are flowcharts illustrating operations of methods of operating of a wireless device according to some embodiments herein. Reference is now made to FIG. 6, which is a flowchart illustrating operations of methods of operating of a wireless device according to some embodiments herein. The method 600 includes determining, by a wireless device, a CA configuration for the wireless device to receive multicast (e.g., eMBMS) data on a plurality of carriers of dedicated mode and/or mixed mode type (block 605). In some embodiments, the CA configuration may in general be determined based at least partially on one or a combination of: a pre-defined rule that delimits one or more acceptable characteristics for at least a portion of the plurality of carriers; a capability of the wireless device that relates to receiving and decoding eMBMS data on a plurality of carriers and a pre-defined set of acceptable CA configurations. The method 600 further includes configuring the determined CA configuration in the wireless device (block 610). In some embodiments, the term CA may include aggregation of carriers with unicast subframes. In some embodiments, the applicable CA configuration may include a wireless device configuration with one or more dedicated carriers and at least one serving cell for unicast data. In some examples, the carriers with (e)MBMS may also be aggregated by the wireless device to receive multicast data.

The configuring may further include configuring/updating/adding to/removing from a set of CC, (de)activating one or more SCells, setting up one or more serving cells, replacing a non-mixed cell with a mixed cell in a set of serving cells or vice versa, changing a PCell, creating or extending a set or a list of one or more UE-operated carriers with multicast data, etc.

The method 600 further includes performing one or more operational tasks under the configured CA configuration (block 615). Examples of operational tasks may generally include receiving multicast data (e.g., eMBMS) in FeMBSFN subframes and/or unicast data in one or more serving cells, performing and/or logging measurements, and/or indicating results to another node.

The method 600, or portions thereof, may also be adapted for implementation in a network node. Many of the operations may be similar, with the exception of operation 615, which as implemented in a network node, may be replaced with an operation of obtaining a result of performing one or more operational tasks under the configured CA configuration.

Figure 7:
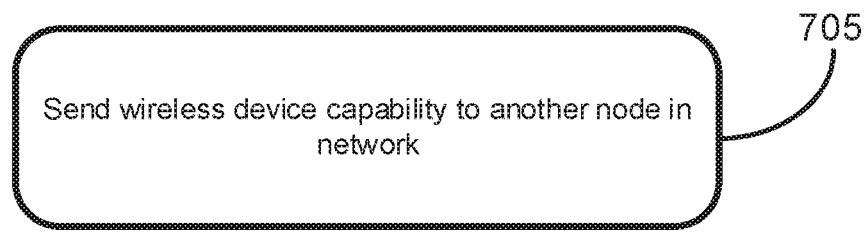

Brief reference is now made to FIG. 7, which illustrates further operations corresponding to determining the CA configuration (block 605) according to some embodiments. Operations include sending, to another node in the wireless communication network, a wireless device capability that corresponds to the wireless device's capability to support one or CA configurations (block 705). In some embodiments, the wireless device's capability to support one or more CA configurations includes at least one of a quantity of carriers during a dedicated multicast operation mode and a quantity of mixed cells that include unicast and FeMBSFN subframes.

Figure 8:
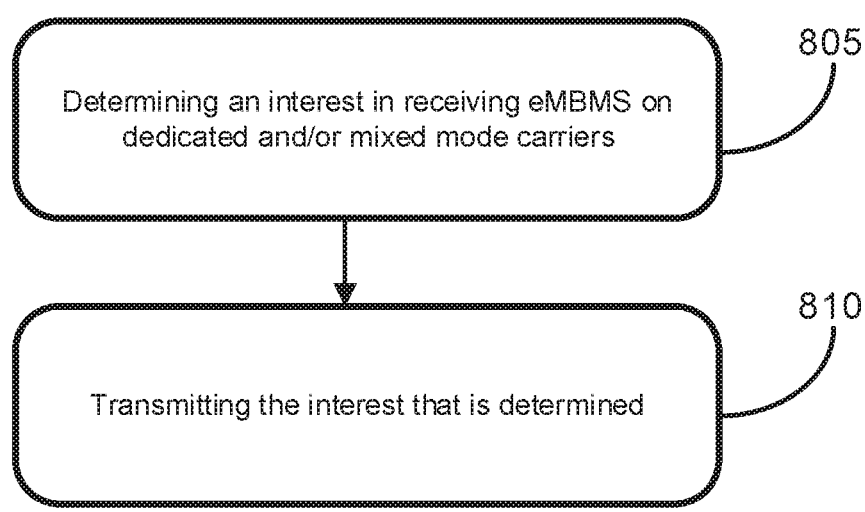

Brief reference is now made to FIG. 8, which illustrates further operations corresponding to determining the CA configuration (block 605) according to some embodiments. Operations include determining, at the wireless device, an interest in receiving multicast data on a number of dedicated carriers and/or a quantity of mixed mode carriers (block 805). Operations may further include transmitting to the other node in the wireless communication network the interest that is determined (block 810).

Figure 9:
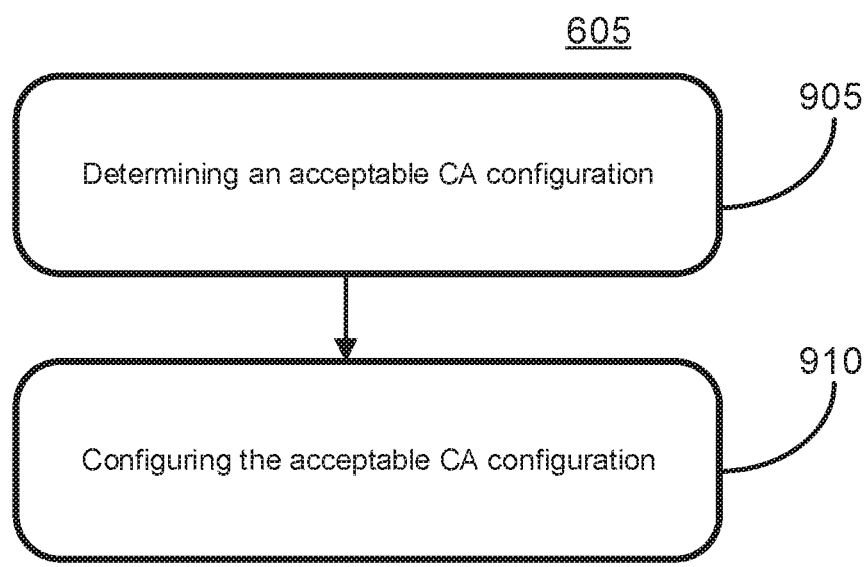

Brief reference is now made to FIG. 9, which illustrates further operations corresponding to determining the CA configuration (block 605) according to some embodiments. Operations may include determining an acceptable CA configuration that includes at least one carrier of the dedicated mode or the mixed mode type (block 905) and configuring the acceptable CA configuration (block 910).

Figure 10:
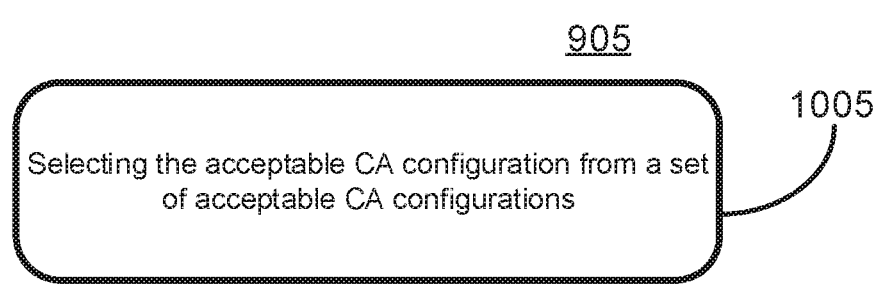

Brief reference is now made to FIG. 10, which illustrates further operations corresponding to determining an acceptable CA configuration (block 905) according to some embodiments. For example, operations may include selecting from a pre-defined set of acceptable CA configurations (block 1005). In some embodiments, determining the acceptable CA configuration is based on an acceptable configuration or characteristics of the acceptable configuration received from the other network node.

Figure 11:
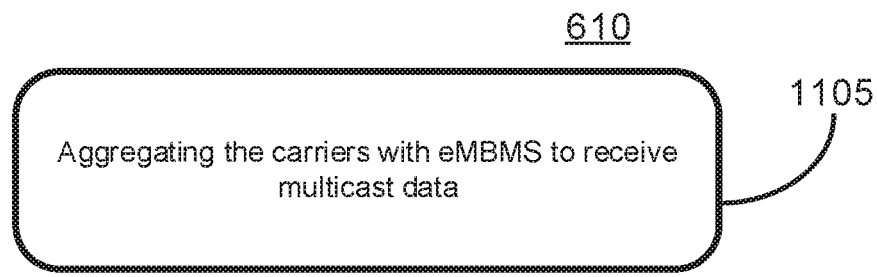

Brief reference is now made to FIG. 11, which illustrates further operations corresponding to configuring the determined CA configuration (block 610) according to some embodiments. Operations may include aggregating, by the wireless device, the carriers with multicast data to receive multicast data (block 1105).

Figure 12:
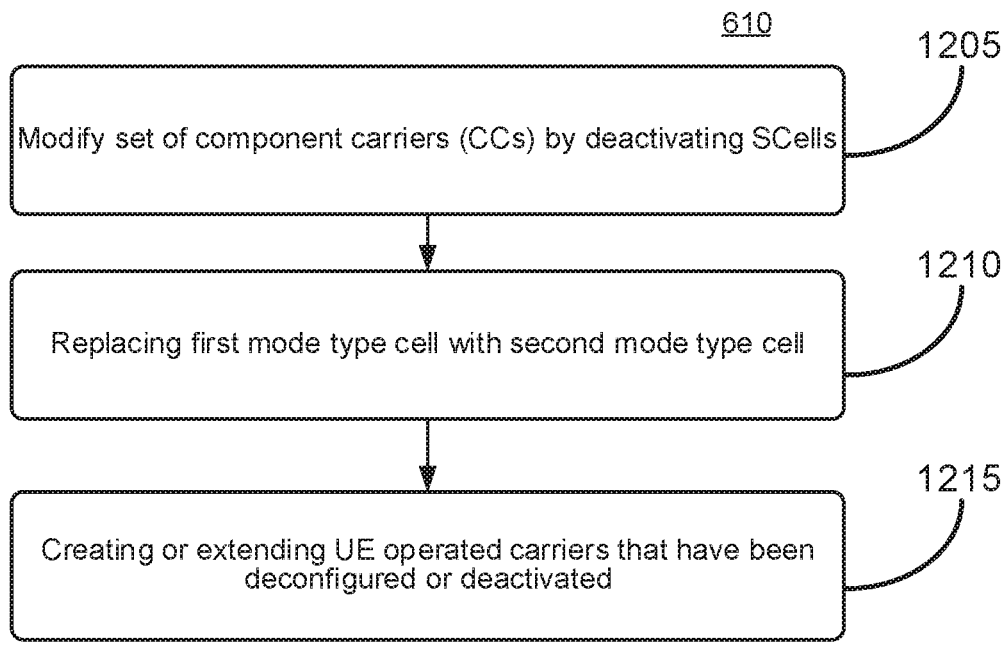

Brief reference is now made to FIG. 12, which illustrates further operations corresponding to configuring the determined CA configuration (block 610) according to some embodiments. Operations may include modifying a set of CC by deactivating one or more SCells (block 1205) and replacing a first mode type cell in a set of serving cells with a second mode type cell (block 1210). Some embodiments provide that the first mode type cell is one of the dedicated mode type and mixed mode type. In some embodiments, the second mode type cell is the other one of the dedicated mode type and the mixed mode type. Some embodiments include creating or extending a set of one or more UE-operated carriers with multicast data (block 1215).

In some embodiments, sending to the other node includes one or more of providing an indicator of whether or not an adaptation is done for CA configuration and/or for multicast carriers and/or providing information about carriers that have been deconfigured and/or deactivated. Some embodiments provide that determining the acceptable CA configuration is based on one or more of a number of CC's with mixed cells, a number of CCs having a predefined percentage range of subframes per carrier, a number of CCs without mixed cells, and a number of activated or deactivated mixed SCells.

Figure 13:
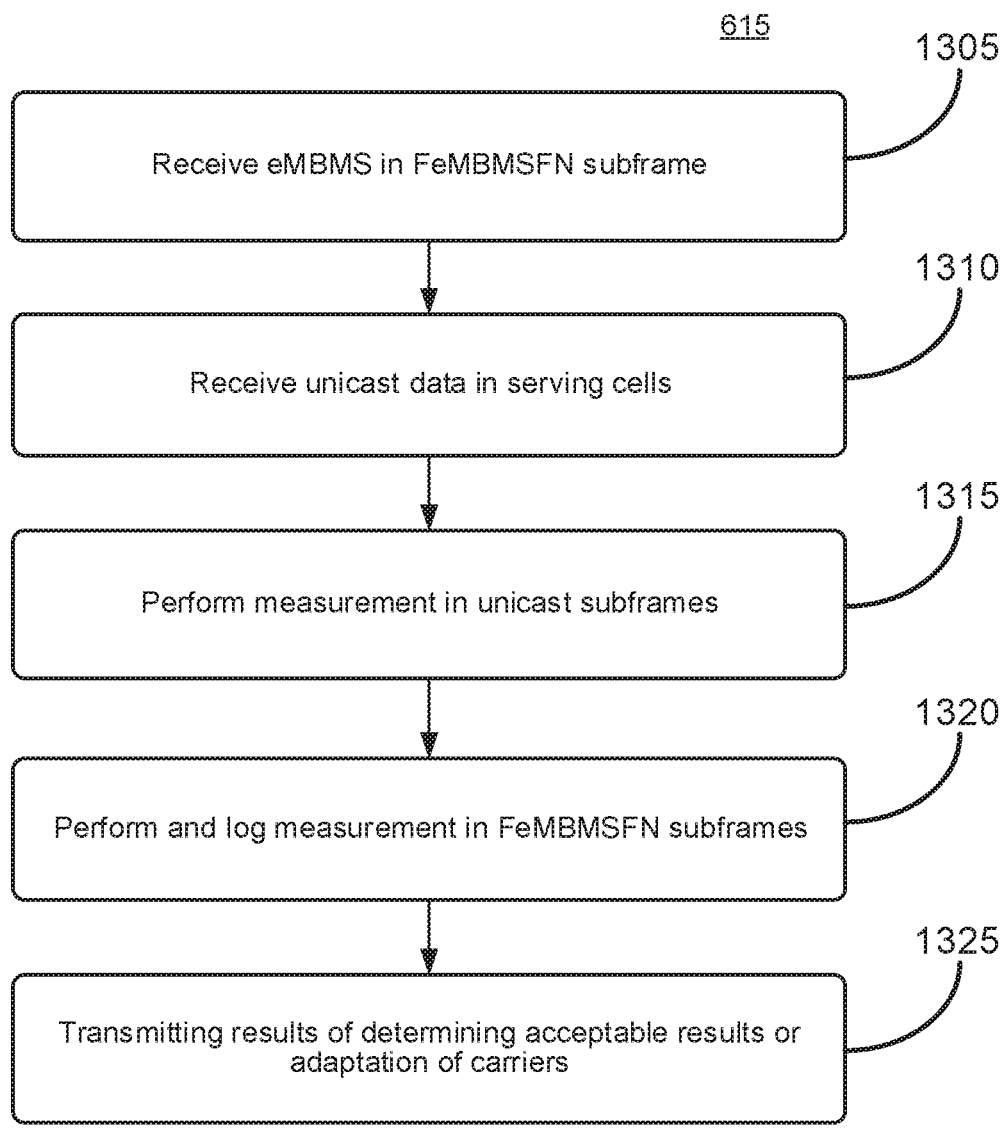

Brief reference is now made to FIG. 13, which illustrates further operations corresponding to performing operational tasks under the configured CA configuration (block 615) according to some embodiments. Operations may include receiving multicast data in FeMBSFN subframes (block 1305), receiving unicast data in one or more serving cells (block 1310), performing a measurement in unicast subframes meeting a pre-defined performance requirement, (block 1315), performing and/or logging a measurement in FeMBSFN subframes meeting a pre-defined performance requirement (block 1320), and transmitting to the another node results of determining the acceptable configuration and/or an adaptation of the set of carriers (block 1325).

Some embodiments provide that the capability of the wireless device that relates to receiving and decoding multicast data on the carriers includes a defined quantity of carriers during dedicated multicast mode and/or with mixed multicast mode of operation. In some embodiments, the capability of the wireless device that relates to receiving and decoding multicast data on the carriers includes a number of carriers and/or bands with mixed cells that are supported, a number of a total of carriers and/or bands in the CA that are supported, a number of carriers and/or bands in the CA that are not multicast that are supported, a number of carriers and/or bands with mixed cells using a different numerology in MBSFN subframes than in unicast subframes in the CA that are supported, a number of carriers and/or bands for which multicast data can be aggregated, and/or a number of MBSFN areas in total or MBSFN areas with specific properties or specific MBSFN configurations in the CA that are supported.

Some embodiments provide that FeMBMS subframes include a subframe transmitting multicast data using a first numerology that includes a subcarrier spacing of 1.25 KHz. In some embodiments, the first numerology includes a symbol duration of about 800 μsec and a CP length of about 200μ. Some embodiments provide that multicast operation and/or data is any one of: a MBMS operation or data and an eMBMS operation or data.

Figure 14:
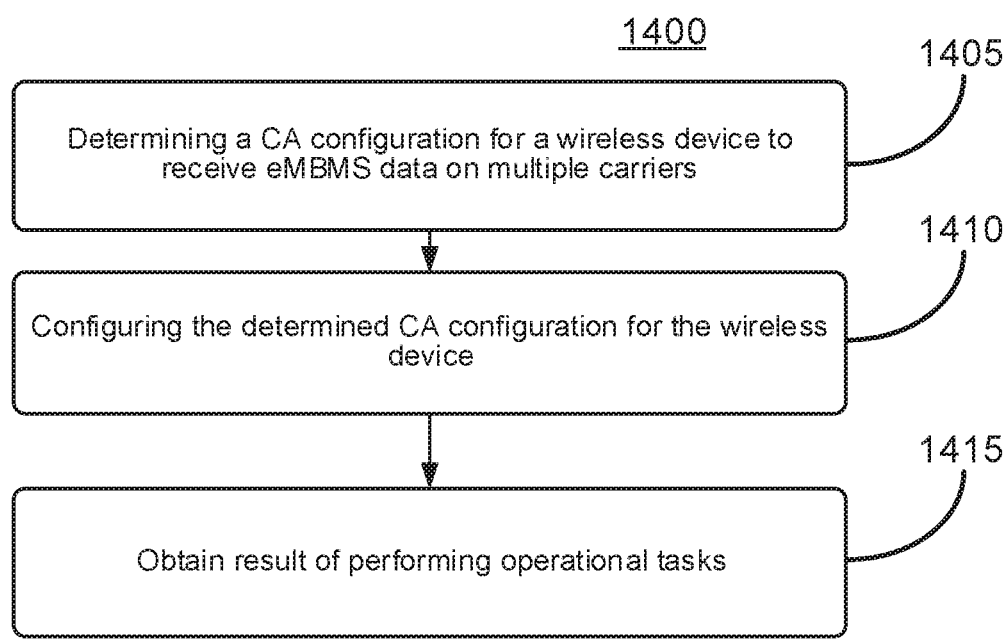

Reference is now made to FIG. 14, which is a flowchart illustrating operations of methods 1400 of operating of a network node in a wireless communication network according to some embodiments herein. Operations according to methods 1400 may include determining a carrier aggregation (CA) configuration for a wireless device to receive multicast data on a plurality of carriers of a dedicated mode type and/or a mixed mode type (block 1405). In some embodiments, the CA configuration may be determined based at least partially on a pre-defined rule that delimits one or more acceptable characteristics for at least a portion of the plurality of carriers, a capability of the wireless device that relates to receiving and decoding multicast data on a plurality of carriers, and a pre-defined set of acceptable CA configurations. Operations may further include configuring the determined CA configuration for the wireless device (block 1410) and obtaining a result of performing one or more operational tasks under the configured CA configuration (block 1415).

Figure 15:
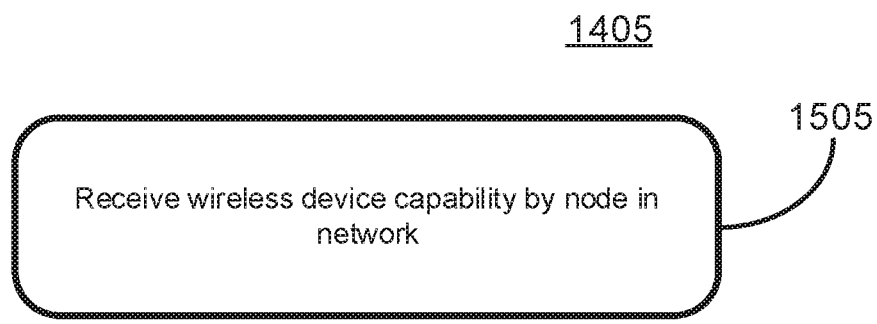

Brief reference is now made to FIG. 15, which illustrates further operations corresponding to determining the CA configuration (block 1405) according to some embodiments. Operations include sending, to another node in the wireless communication network, a wireless device capability that corresponds to the wireless device's capability to support one or CA configurations (block 1505). In some embodiments, the wireless device's capability to support one or more CA configurations includes at least one of a quantity of carriers during a dedicated multicast operation mode and a quantity of mixed cells that include unicast and FeMBSFN subframes.

Figure 16:
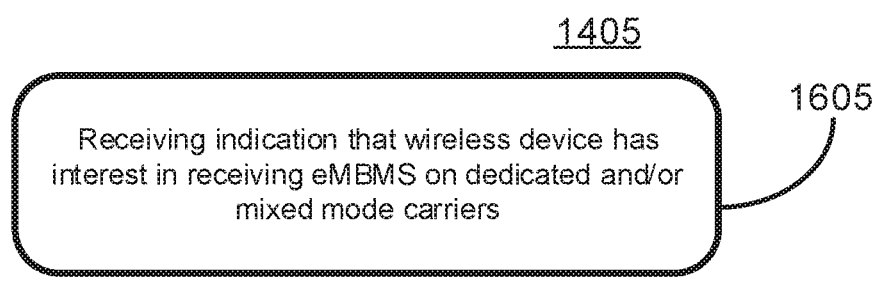

Brief reference is now made to FIG. 16, which illustrates further operations corresponding to determining the CA configuration (block 1405) according to some embodiments. Operations include receiving, by the network node in the wireless communication network, an indication that the wireless device has an interest in receiving multicast data on a quantity of dedicated carriers and/or a quantity of mixed mode carriers (block 1605).

Figure 17:
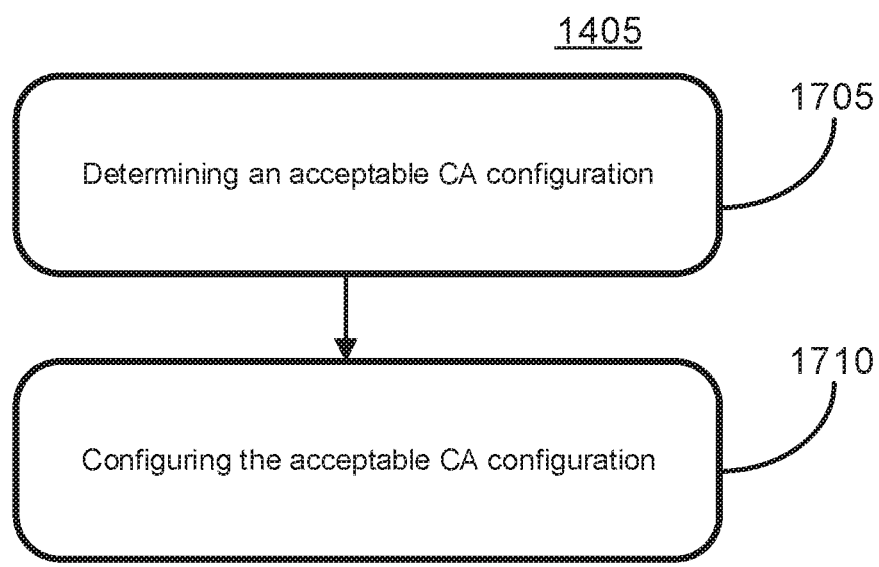

Brief reference is now made to FIG. 17, which illustrates further operations corresponding to determining the CA configuration (block 1405) according to some embodiments. Operations include determining an acceptable CA configuration that includes at least one carrier of the dedicated mode or the mixed mode type (block 1705). Operations may further include configuring the acceptable CA configuration (block 1710).

Figure 18:
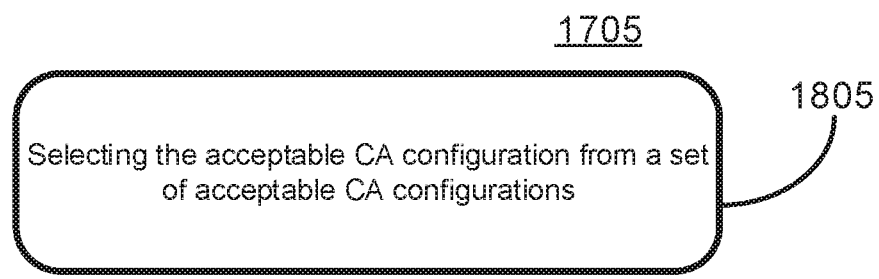

Brief reference is now made to FIG. 18, which illustrates further operations corresponding to determining an acceptable CA configuration (block 1705) according to some embodiments. Operations may include selecting from a pre-defined set of acceptable CA configurations (block 1805).

Figure 19:
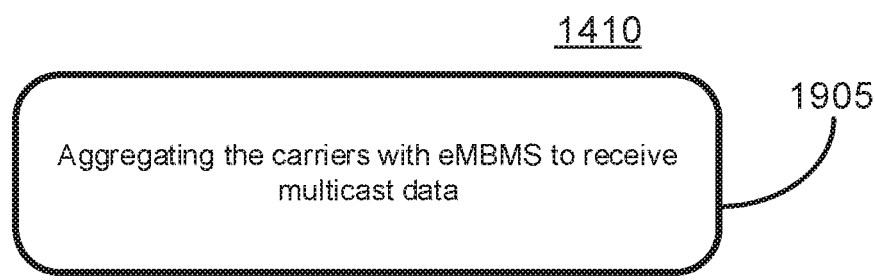

Brief reference is now made to FIG. 19, which illustrates further operations corresponding to configuring the determined CA configuration (block 1410) according to some embodiments. For example, operations may include aggregating the carriers with multicast data to receive multicast data (block 1905).

Figure 20:
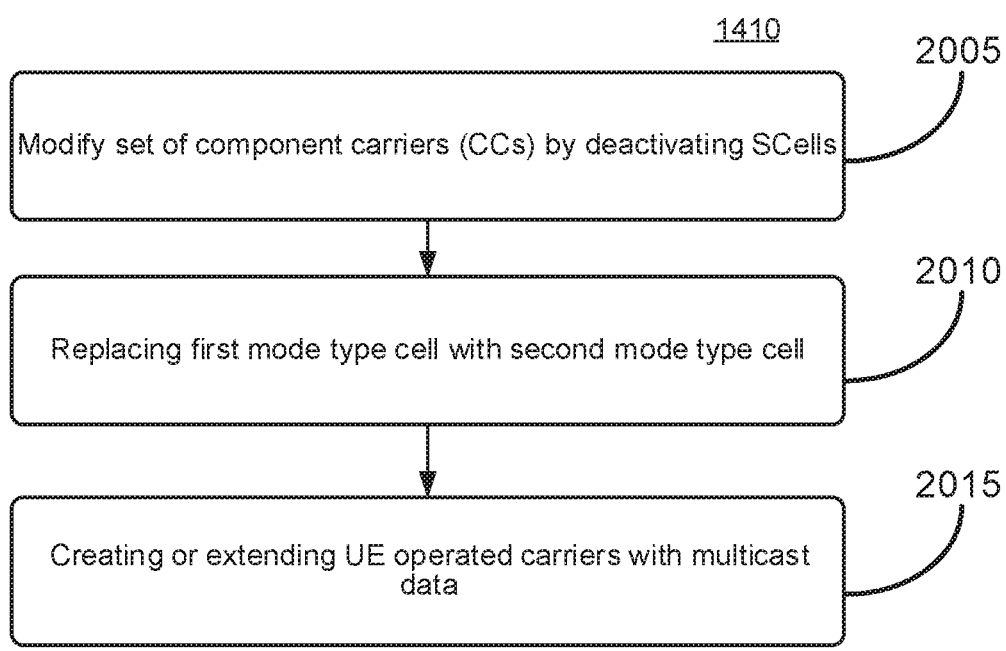

Brief reference is now made to FIG. 20, which illustrates further operations corresponding to configuring the determined CA configuration (block 1410) according to some embodiments. Operations may include modifying a set of CC by deactivating one or more SCells (block 2005), replacing a first mode type cell in a set of serving cells with a second mode type cell (block 2010) and creating or extending a set of one or more UE-operated carriers with multicast data (block 2015). In some embodiments, the first mode type cell is one of the dedicated mode type and mixed mode type. Some embodiments provide that the second mode type cell is the other one of the dedicated mode type and the mixed mode type.

Figure 21:
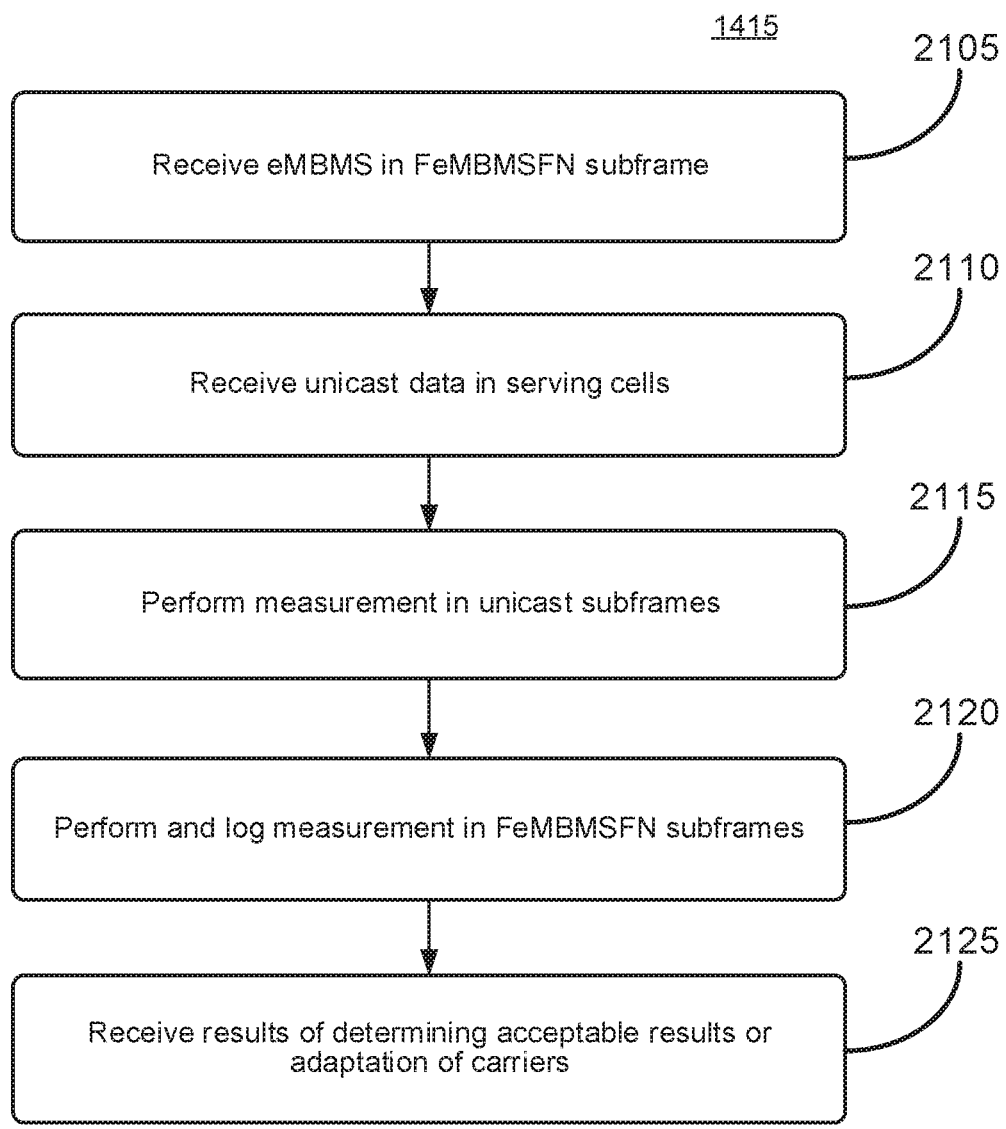

Brief reference is now made to FIG. 21, which illustrates further operations corresponding to performing operational tasks under the configured CA configuration (block 1415) according to some embodiments. Operations may include receiving multicast data in FeMBSFN subframes (block 2105), receiving unicast data in one or more serving cells (block 2110), performing a measurement in unicast subframes meeting a pre-defined performance requirement, (block 2115), performing and/or logging a measurement in FeMBSFN subframes meeting a pre-defined performance requirement (block 2120), and receiving results of determining the acceptable configuration and/or an adaptation of the set of carriers (block 2125).

Figure 22:
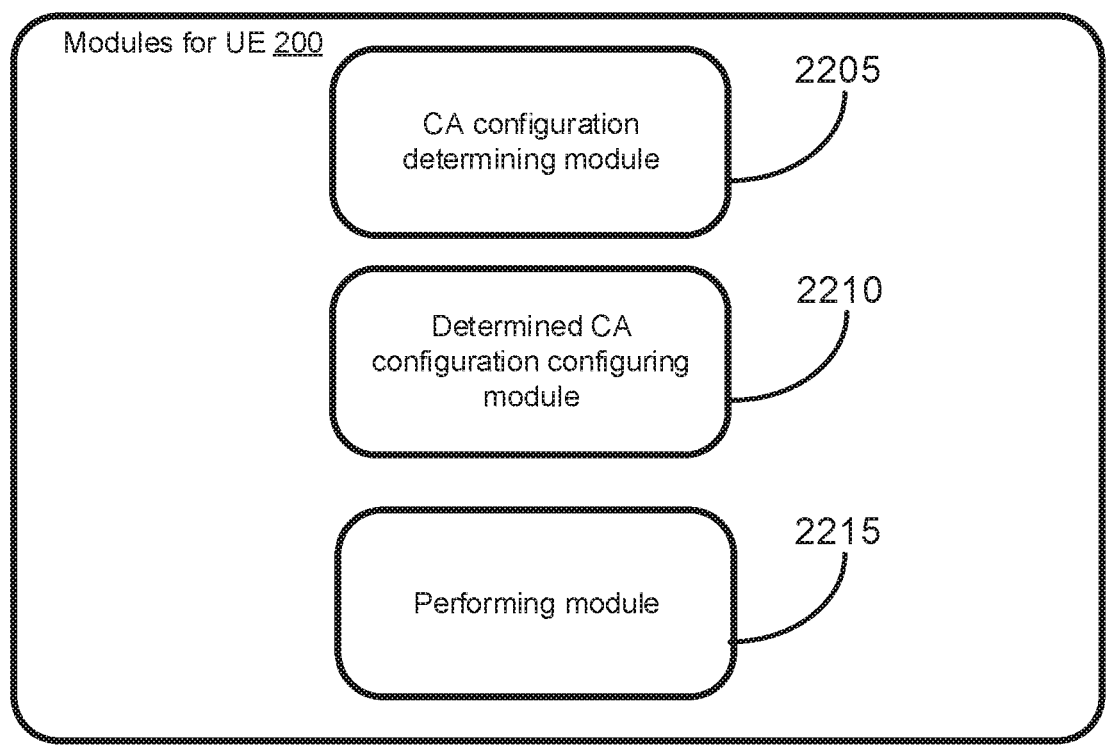
FIG. 22 illustrates modules for a UE that perform operations as disclosed herein according to some embodiments.

FIG. 22 illustrates modules for a UE 200 that perform operations as disclosed herein according to some embodiments. Some embodiments include a CA configuration determining module 2205 that is configured to determine a carrier aggregation (CA) configuration for the wireless device to receive multicast data on multiple of carriers of a dedicated mode type and/or a mixed mode type. The CA configuration may be determined based on a pre-defined rule that delimits one or more acceptable characteristics for at least a portion of the carriers, a capability of the wireless device that relates to receiving and decoding multicast data on multiple carriers, and/or a pre-defined set of acceptable CA configurations. A determined CA configuration configuring module 2210 may be operable to configure the determined CA configuration in the wireless device. A performing module 2215 may be operable to perform one or more operational tasks under the configured CA configuration.

Figure 23:
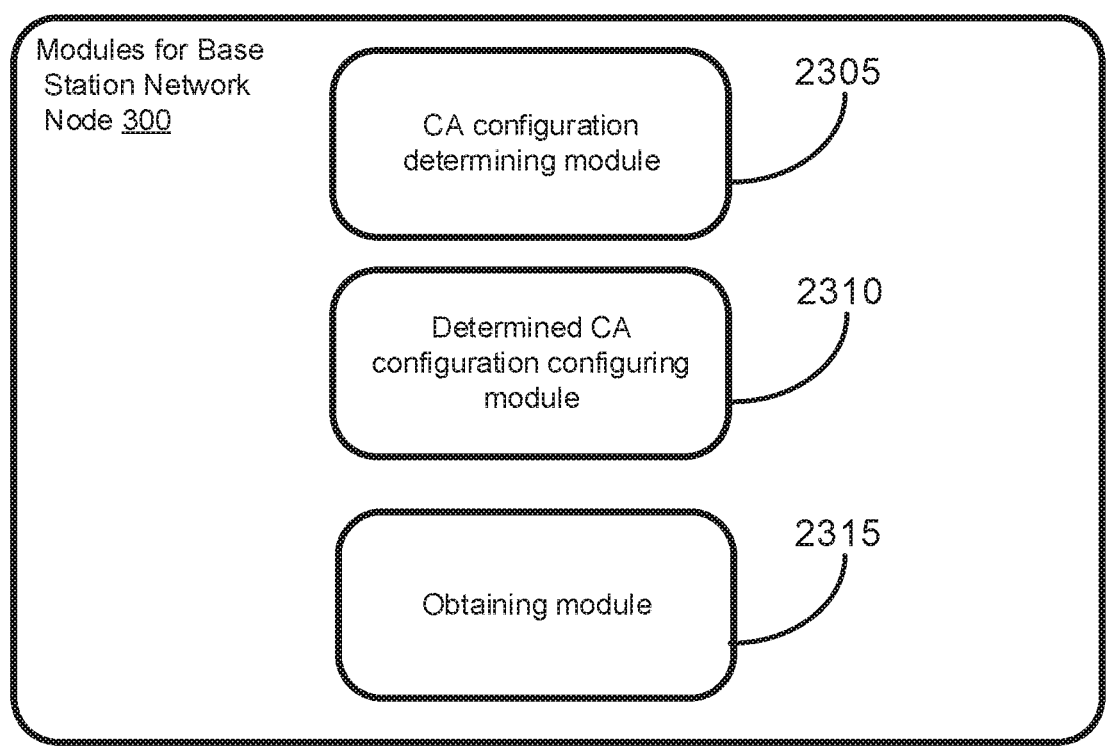
FIG. 23 illustrates modules for a base station network node that perform operations as disclosed herein according to some embodiments.

FIG. 23 illustrates modules for a base station network node 300 that perform operations as disclosed herein according to some embodiments. Some embodiments include a CA configuration determining module 2305 that is configured to determine a carrier aggregation (CA) configuration for the wireless device to receive multicast data on multiple of carriers of a dedicated mode type and/or a mixed mode type. The CA configuration may be determined based on a pre-defined rule that delimits one or more acceptable characteristics for at least a portion of the carriers, a capability of the wireless device that relates to receiving and decoding multicast data on multiple carriers, and/or a pre-defined set of acceptable CA configurations. A determined CA configuration configuring module 2310 may be operable to configure the determined CA configuration in the wireless device. An obtaining module 2315 may be operable to obtain a result of performing one or more operational tasks under the configured CA configuration.

Figure 24:
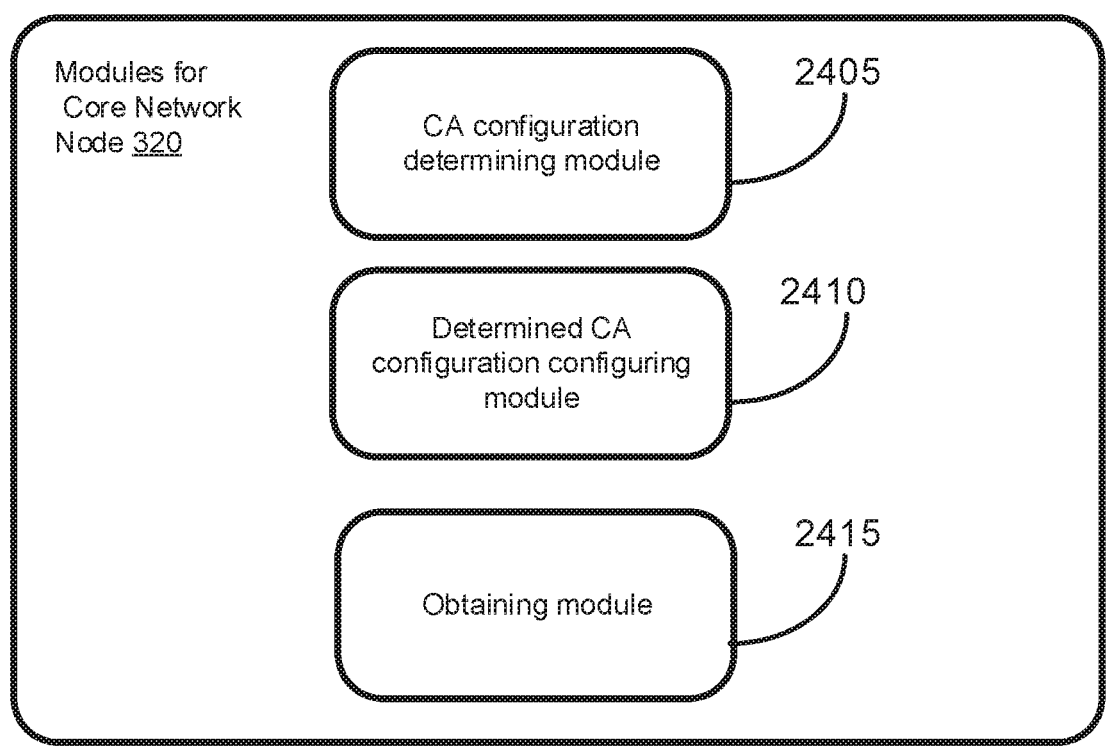
FIG. 24 illustrates modules for a core network node that perform operations as disclosed herein according to some embodiments.

FIG. 24 illustrates modules for a core network node 320 that perform operations as disclosed herein according to some embodiments. Some embodiments include a CA configuration determining module 2405 that is configured to determine a carrier aggregation (CA) configuration for the wireless device to receive multicast data on multiple of carriers of a dedicated mode type and/or a mixed mode type. The CA configuration may be determined based on a pre-defined rule that delimits one or more acceptable characteristics for at least a portion of the carriers, a capability of the wireless device that relates to receiving and decoding multicast data on multiple carriers, and/or a pre-defined set of acceptable CA configurations. A determined CA configuration configuring module 2410 may be operable to configure the determined CA configuration in the wireless device. An obtaining module 2415 may be operable to obtain a result of performing one or more operational tasks under the configured CA configuration.

In some embodiments, a computer program comprises instructions which, when executed by at least one processor, causes at least one processor to carry out the functionality of a radio access node or another node implementing one or more of the functions of the radio access node in a virtual environment according to any of the embodiments described herein.

While the disclosed subject matter has been presented above with reference to various embodiments, it will be understood that various changes in form and details may be made to the described embodiments without departing from the overall scope of the disclosed subject matter.

LIST OF ABBREVIATIONS

MBMS Multimedia Broadcast Multicast Service
MCE Multi-cell/multicast Coordination Entity
Tx Transmitter
UE User Equipment
BS Base Station
BLER Block Error Ratio
eNB Evolved Node B, base station
E-UTRAN Evolved universal terrestrial radio access network
E-UTRA Evolved universal terrestrial radio access
E-UTRA FDD E-UTRA frequency division duplex
E-UTRA TDD E-UTRA time division duplex
LTE Long term evolution
RAT Radio Access Technology
TDD Time division duplex
WLAN Wireless Local Area Network
DL Downlink
UL Uplink
SINR Signal-to-Interference plus Noise Ratio
SNR Signal-to-Noise Ratio
DPD Digital Predistortion
IM Inter modulation
TPC Transmission Power Control In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random-access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

What is claimed is:

1. A method of operating a wireless device in a wireless communication network, the method comprising:
   determining a carrier aggregation (CA) configuration for the wireless device to receive multicast data on a plurality of carriers of a mixed mode type, wherein carriers operating in the mixed mode type comprise carriers from mixed cells with unicast and further evolved multimedia broadcast multicast services (FeMBMS) subframes, the CA configuration being determined based at least partially on at least one of:
      a pre-defined rule that delimits one or more characteristics for at least a portion of the plurality of carriers;
      a capability of the wireless device that relates to receiving and decoding multicast data on a plurality of carriers; and
      a pre-defined set of supported CA configurations;
   configuring the determined CA configuration in the wireless device; and
   performing one or more operational tasks under the configured CA configuration.

2. The method of claim 1, wherein determining the CA configuration comprises sending to another node in the wireless communication network, a wireless device capability that corresponds to the wireless device's capability to support one or CA configurations,
   wherein the wireless device's capability to support one or more CA configurations comprises at least one of a quantity of carriers during a dedicated multicast operation mode and a quantity of mixed cells that include unicast and multimedia broadcast single frequency network (MBSFN) subframes.

3. The method of claim 2, wherein determining the CA configuration further comprises:
   determining, at the wireless device, an interest in receiving multicast data on a number of dedicated carriers and/or a quantity of mixed mode carriers; and
   transmitting to the other node in the wireless communication network the interest that is determined.

4. The method of claim 3, wherein determining the CA configuration further comprises:
   determining the CA configuration that includes at least one carrier of the mixed mode type; and
   configuring the CA configuration.

5. The method of claim 4, wherein determining the CA configuration comprises selecting from a pre-defined set of supported CA configurations.

6. The method of claim 4, wherein determining the CA configuration is based on a configuration or characteristics of the configuration received from the other node.

7. The method of claim 4, wherein configuring the CA configuration comprises aggregating, by the wireless device, the carriers with multicast data to receive multicast data.

8. The method of claim 4, wherein configuring the CA configuration comprises at least one of:
   modifying a set of component carriers (CCs) by deactivating one or more secondary cells;
   replacing a first mode type cell in a set of serving cells with a second mode type cell, wherein the first mode type cell is one of a dedicated mode type and the mixed mode type, and
   wherein the second mode type cell is the other one of the dedicated mode type and the mixed mode type; and
   creating or extending a set of one or more UE-operated carriers with multicast data.

9. The method of claim 4, wherein sending to the other node comprises at least one of providing an indicator of whether or not an adaptation is done for CA configuration and/or for multicast carriers and/or providing information about carriers that have been deconfigured and/or deactivated.

10. The method of claim 4, wherein determining the CA configuration is based on at least one of:
    a number of CCs with mixed cells;
    a number of CCs having a predefined percentage range of subframes per carrier;
    a number of CCs without mixed cells; and
    a number of activated or deactivated mixed secondary cells.

11. The method of claim 1, wherein performing the one or more operational tasks comprises at least one of:
    receiving multicast data in further evolved multimedia broadcast single frequency network (FeMBSFN) subframes;
    receiving unicast data in one or more serving cells;
    performing a measurement in unicast subframes meeting a pre-defined performance requirement;
    performing and/or logging a measurement in FeMBSFN subframes meeting a pre-defined performance requirement; and
    transmitting to the other node results of determining the configuration and/or an adaptation of the set of carriers.

12. The method of claim 1, wherein the capability of the wireless device that relates to receiving and decoding multicast data on the plurality of carriers comprises:
    a defined quantity of carriers during mixed multicast mode of operation.

13. The method of claim 1, wherein the capability of the wireless device that relates to receiving and decoding multicast data on the plurality of carriers comprises at least one of:
    a number of carriers and/or bands with mixed cells that are supported;
    a number of a total of carriers and/or bands in the CA that are supported;
    a number of carriers and/or bands in the CA that are not multicast that are supported;
    a number of carriers and/or bands with mixed cells using a different numerology in multimedia broadcast single frequency network (MBSFN) subframes than in unicast subframes in the CA that are supported;
    a number of carriers and/or bands for which multicast data can be aggregated; and
    a number of MBSFN areas in total or MBSFN areas with specific properties or specific MBSFN configurations in the CA that are supported.

14. The method of claim 1, wherein FeMBMS subframes comprise a subframe transmitting multicast data using a first numerology that includes a subcarrier spacing of 1.25 KHz.

15. The method of claim 14, wherein the first numerology further comprises a symbol duration of about 800 μsec and a cyclic prefix length of about 200μ.

16. The method of claim 1, wherein multicast operation and/or data is any one of: a multimedia broadcast multicast services (MBMS) operation or data and an evolved MBMS operation or data.

17. A radio communication network comprising:
    a first radio node that comprises:
       a transceiver to provide wireless communication over a radio interface;

at least one processor coupled to the transceiver; and at least one memory coupled to the at least one processor and storing program code that when executed by the at least one processor causes the at least one processor to perform operations comprising:

determining a carrier aggregation (CA) configuration for a wireless device to receive multicast data on a plurality of carriers of a mixed mode type, wherein carriers operating in the mixed mode type comprise carriers from mixed cells with unicast and further evolved multimedia broadcast multicast services (FeMBMS) subframes, the CA configuration being determined based at least partially on at least one of:

a pre-defined rule that delimits one or more characteristics for at least a portion of the plurality of carriers;

a capability of the wireless device that relates to receiving and decoding multicast data on a plurality of carriers; and a pre-defined set of supported CA configurations;

configuring the determined CA configuration in the wireless device; and performing one or more operational tasks under the configured CA configuration.

18. A wireless communication device (UE) comprising:

a transceiver to provide wireless communication over a radio interface;

at least one processor coupled to the transceiver; and at least one memory coupled to the at least one processor and storing program code that when executed by the at least one processor causes the at least one processor to perform operations comprising:

determining a carrier aggregation (CA) configuration for the wireless device to receive multicast data on a plurality of carriers of a mixed mode type, wherein carriers operating in the mixed mode type comprise carriers from mixed cells with unicast and further evolved MBMS (FeMBMS) subframes, the CA configuration being determined based at least partially on at least one of:

a pre-defined rule that delimits one or more acceptable characteristics for at least a portion of the plurality of carriers;

a capability of the wireless device that relates to receiving and decoding multicast data on a plurality of carriers; and a pre-defined set of supported CA configurations;

configuring the determined CA configuration in the wireless device; and performing one or more operational tasks under the configured CA configuration.

19. The wireless communication device of claim 18, wherein determining the CA configuration comprises sending, to another node in a wireless communication network, a wireless device capability that corresponds to the wireless device's capability to support one or CA configurations, wherein the wireless device's capability to support one or more CA configurations comprises at least one of a quantity of carriers during a dedicated multicast operation mode and a quantity of mixed cells that include unicast and multimedia broadcast single frequency network (MBSFN) subframes;

determining, at the wireless device, an interest in receiving multicast on a quantity of dedicated carriers and/or a quantity of mixed mode carriers;

transmitting to the other node in the wireless communication network the interest that is determined;

determining CA configuration that includes at least one carrier of the dedicated mode or the mixed mode type; and configuring the CA configuration, and wherein configuring the CA configuration comprises aggregating the carriers with multicast to receive multicast data.

20. The wireless communication device of claim 19, wherein configuring the CA configuration comprises at least one of:

modifying a set of component carriers by deactivating one or more secondary cells;

replacing a first mode type cell in a set of serving cells with a second mode type cell, wherein the first mode type cell is one of the dedicated mode type and mixed mode type, and wherein the second mode type cell is the other one of the dedicated mode type and the mixed mode type; and creating or extending a set of one or more UE-operated carriers with multicast data.

* * * * *

UNITED STATES PATENT AND TRADEMARK OFFICE
CERTIFICATE OF CORRECTION

PATENT NO. : 11,382,065 B2
APPLICATION NO. : 16/485688
DATED : July 5, 2022
INVENTOR(S) : Siomina et al.

It is certified that error appears in the above-identified patent and that said Letters Patent is hereby corrected as shown below:

On the Title Page

Item (73), under "Assignee", in Column 1, Lines 1-2, delete "TELFFONAKTIEBOLAGET LM ERICSSON (PUBL)," and insert -- TELEFONAKTIEBOLAGET LM ERICSSON (PUBL), --, therefor.

In the Specification

In Column 3, Line 44, delete "200μ." and insert -- 200 μ. --, therefor.

In Column 5, Line 14, delete "200μ." and insert -- 200 μ. --, therefor.

In Column 9, Line 19, delete "O & M," and insert -- O&M, --, therefor.

In Column 14, Line 22, delete "(Q4>Q3)" and insert -- (Q4≥Q3) --, therefor.

In Column 14, Line 29, delete "P21<P2; P22<P2." and insert -- P21≤P2; P22≤P2. --, therefor.

In Column 22, Line 6, delete "200μ." and insert -- 200 μ. --, therefor.

In the Claims

In Column 28, Line 59, in Claim 15, delete "200μ." and insert -- 200 μ. --, therefor.

In Column 29, Lines 42-43, in Claim 18, delete "more acceptable characteristics" and insert -- more characteristics --, therefor.

Signed and Sealed this
Sixth Day of June, 2023

Katherine Kelly Vidal
*Director of the United States Patent and Trademark Office*